United States Patent
Riehn

(10) Patent No.: US 12,498,334 B2
(45) Date of Patent: Dec. 16, 2025

(54) DUAL ENERGY DETECTOR AND METHODS FOR PROCESSING DETECTOR DATA

(71) Applicant: SMITHS DETECTION GERMANY GMBH, Wiesbaden (DE)

(72) Inventor: Eric J. Riehn, Wiesbaden (DE)

(73) Assignee: Smiths Detection Germany GmbH, Wiesbaden (DE)

( * ) Notice: Subject to any disclaimer, the term of this patent is extended or adjusted under 35 U.S.C. 154(b) by 301 days.

(21) Appl. No.: 18/003,530

(22) PCT Filed: Jul. 1, 2021

(86) PCT No.: PCT/EP2021/068274
§ 371 (c)(1),
(2) Date: Dec. 28, 2022

(87) PCT Pub. No.: WO2022/003141
PCT Pub. Date: Jan. 6, 2022

(65) Prior Publication Data
US 2023/0251208 A1   Aug. 10, 2023

(30) Foreign Application Priority Data
Jul. 2, 2020   (DE) .......................... 102020117484.5

(51) Int. Cl.
*G01N 23/04*   (2018.01)
*G01N 23/083*   (2018.01)

(52) U.S. Cl.
CPC ........... *G01N 23/04* (2013.01); *G01N 23/083* (2013.01); *G01N 2223/50* (2013.01); *G01N 2223/643* (2013.01)

(58) Field of Classification Search
CPC .. G01N 23/04; G01N 23/083; G01N 2223/50; G01V 5/224
See application file for complete search history.

(56) References Cited

U.S. PATENT DOCUMENTS

| | | |
|---|---|---|
| 3,971,065 A | 7/1976 | Bayer |
| 8,433,036 B2 | 4/2013 | Morton |
| (Continued) | | |

FOREIGN PATENT DOCUMENTS

| | | |
|---|---|---|
| CA | 2254877 A1 | 11/1997 |
| EP | 0176314 A2 | 4/1986 |
| (Continued) | | |

OTHER PUBLICATIONS

PCT International Search Report and Written Opinion, Application No. PCT/EP2021/068274, dated Oct. 13, 2021, 13 pages.
(Continued)

*Primary Examiner* — David P Porta
(74) *Attorney, Agent, or Firm* — Armstrong Teasdale LLP

(57) ABSTRACT

Disclosed is a dual-energy X-ray detector having a first detector line with first detector elements and a second detector line with second detector elements arranged parallel thereto, the detector lines being arranged parallel to one another in the line direction and being arranged one behind the other in the direction of the X-ray beams to be detected in such a manner that the projection of the first and the second detector lines in the direction of one of the X-ray beams to be detected, which passes through the surface center of gravity of a reference detector element of the first or the second detector line, are overlappingly offset from each other by an effective offset ($\Delta x$; $\Delta y$). Further disclosed is an X-ray inspection apparatus including such a detector and methods for processing detector data provided by means of the detector.

16 Claims, 13 Drawing Sheets

(56) References Cited

U.S. PATENT DOCUMENTS

| | | | | |
|---|---|---|---|---|
| 8,873,713 | B2* | 10/2014 | Suyama | G01N 23/04 |
| | | | | 378/98.12 |
| 8,981,310 | B2* | 3/2015 | Suyama | G01V 5/226 |
| | | | | 378/98.12 |
| 9,329,301 | B2 | 5/2016 | Suyama | |
| 10,067,239 | B2* | 9/2018 | Nelson | G01T 1/1614 |
| 10,191,160 | B1* | 1/2019 | Newman | G01T 1/20 |
| 10,386,502 | B2 | 8/2019 | Li et al. | |
| 2013/0292574 | A1* | 11/2013 | Levene | G01T 1/362 |
| | | | | 250/362 |
| 2019/0179038 | A1 | 6/2019 | Tseng | |

FOREIGN PATENT DOCUMENTS

| | | | |
|---|---|---|---|
| EP | 1010021 B1 | 10/2004 | |
| WO | WO-2016024502 A1 * | 2/2016 | G01N 23/04 |

OTHER PUBLICATIONS

German Search Report, Application No. 102020117484.5, dated Jan. 5, 2021, 10 pps.

Jurgen Beyerer et al., "OCM 2013—Optical Characterization of Materials—conference proceedings", Jan. 1, 2013, pp. 1-298, https://www.db-thueringen.de/servlets/MCRFileNodeServlet/dbt_derivate_00044846/978-3-86644-965-7.pdf.

Li et al., "Color filter array demosaicking using high-order interpolation techniques with a weighted median filter for sharp color edge preservation.", In: IEEE Transactions on Image Processing, vol. 18, No. 9, pp. 1946-1957, 2009, https://ieeexplore.ieee.org/stamp/stamp.jsp?tp=&arnumber=5109690&tag=1.

Jer Wang Chan et al., "Wire transfer function analysis for castellated dual-energy x-ray detectors", Applied Optics, vol. 43, Issue 35, pp. 6413-6420, 2004, https://doi.org/10.1364/AO.43.006413.

* cited by examiner $1 \leq n \leq N\ (N=8)$

DUAL ENERGY DETECTOR AND METHODS FOR PROCESSING DETECTOR DATA

CROSS-REFERENCE TO RELATED APPLICATIONS

This patent application is a National Stage Entry of PCT/GB2021/052108 filed on Aug. 13, 2021, which claims priority to GB Application No. 2013016.7 filed on Aug. 20, 2020, the disclosures of which are hereby incorporated by reference herein in their entirety as part of the present application.

BACKGROUND

The present disclosure relates generally to the spatial resolution of X-ray images in the imaging, non-destructive inspection of objects for finding target objects by means of dual-energy X-ray radiography, and in particular to measures for increasing the spatial resolution of an X-ray image produced thereby. In particular, the disclosure relates to a dual-energy X-ray detector with improved spatial resolution, an X-ray inspection apparatus including such a detector, and methods for processing detector data acquired by the detector.

The following introductory background information to the present disclosure is intended solely to provide a better understanding of the relationships described below and represents prior art only to the extent of the contents of a cited document.

Discrimination of materials by dual-energy X-ray radiography is well known; the basic considerations thereof are described, for example, in the following documents: S. Kolkoori et al, "Dual High-Energy X-ray Digital Radiography for Material Discrimination in Cargo Containers," 11th European Conference on Non Destructive Testing, 2014, Prague, Proceedings; and Polad M. Shikhaliev, "Material Decomposed Cargo Imaging with Dual Energy Megavoltage Radiography," arXiv: 1709.10406 [physics.ins-det].

Jer Wang CHAN et al, "Wire transfer function analysis for castellated dual-energy x-ray detectors," APPLIED OPTICS, Volume 43, Number 35, Dec. 10, 2004, Pages 6413-6420, shows in FIG. 1(a) a dual-energy x-ray detector array with one high-energy detector element and one low-energy detector element per pixel, arranged one above the other in the direction of the x-rays to be detected. EP 1 010 021 B1 shows a dual-energy X-ray detector line in which a line with high-energy detector elements and a line with low-energy detector elements are arranged one behind the other in the scanning direction in such a way that the two lines can detect incident X-rays independently of one another.

In X-ray inspection apparatuses in which an inspection object is transported at a predetermined transport speed through a scanning arrangement including a detector line arranged transversely to the transport direction and an X-ray fan directed towards the detector line, for a line-by-line scanning of the inspection object through the X-ray fan, the resolution of an X-ray image produced thereby is essentially determined by the area of the individual detector elements each corresponding to a pixel and their number per unit of length or per unit of area of the detector line as well as the ratio of the read-out frequency of the detector elements and the transport speed of the inspection object in the transport direction.

Since dual-energy X-ray radiography requires one low-energy and one high-energy detector element per pixel, the entire detector requires twice the number of detector elements required for the desired spatial resolution. Therefore, dual-energy detectors already have correspondingly higher system costs. To obtain a higher spatial resolution in the generated X-ray image, the number of detector elements per unit length or area could be increased accordingly. However, this leads to a corresponding increase in system cost for the detector and, since increasing the density of the detector elements requires a corresponding decrease in the area of each detector element, a degradation of the signal-to-noise ratio in the acquired detector data.

As an alternative to increasing the number of detector elements, in the above X-ray inspection apparatuses, the spatial resolution of the X-ray image in the scanning direction corresponding to the transport direction could be achieved by reducing the transport speed or increasing the readout frequency. The former has a detrimental effect on the throughput of the inspection objects inspected at the X-ray inspection apparatus, while the latter again worsens the signal-to-noise ratio.

BRIEF DESCRIPTION

A dual-energy X-ray detector or an X-ray inspection apparatus including a dual-energy X-ray detector, with which a higher spatial resolution can be achieved in the generated X-ray images is proposed herein.

It is generally desirable that the number of detector elements of the detector per unit length or area is not increased and/or the scanning speed of the inspection object by the X-ray inspection apparatus is not reduced.

For example, it would be an improvement for a dual-energy detector if, with a constant number of (at least high-energy X-ray detecting, in short "high-energy") Hi(gh)- and (at least low-energy X-ray detecting, in short "low-energy") Lo(w)-detector elements, an X-ray image with a higher spatial resolution in the image direction orthogonal to and/or along the scanning direction can be derived from the detector data detected by the detector.

The inventor has recognized that a defined effective offset between the still overlapping effective areas of the Hi(gh)-detector elements of a Hi-detector line and the Lo(w)-detector elements of a Lo-detector line, of which in a conventional dual-energy X-ray detector one Hi-detector element and one Lo-detector element each are assigned to exactly one and the same pixel, can be used for improving the spatial resolution. The effective offset can be configured in the direction of the detector line and/or orthogonal to the detector line; the respective possibilities achievable with this are explained further below. The spatial resolution of the detector can thus be increased accordingly in the direction of the detector line and/or orthogonal to the detector line without increasing the total number of detector elements.

It is noted that "effective offset" in the context of the present disclosure is intended to mean that the offset is not only as an actual local offset between the effective areas of the Hi-detector elements of the Hi-detector line and the Lo-detector elements of the Lo-detector line but alternatively or additionally by a specific alignment of the detector including the Hi-detector line and the Lo-detector line, which do not have to be locally offset from each other, with respect to the X-rays directed onto the detector during operation. Of course, these measures can also be used in combination.

The core idea of the line-shaped dual-energy X-ray detector proposed here is to design the detector structure and/or to arrange the detector lines of the detector with respect to each other and with respect to the X-ray source in such a way that, in operation, with respect to the beam path of the X-rays emitted from an X-ray source onto the detector, the projections of the Hi-detector elements of the Hi-detector line and of the Lo-detector elements of the Lo-detector line are offset with respect to each other in an overlapping manner in the direction of a reference X-ray beam; the "reference X-ray beam" may be, for example, the X-ray beam passing through the area centroid of the detector line or of a reference detector element of the detector line. The reference detector element can be a detector element in the center of the detector line, which thus has an approximately equal distance to all edges of the detector line. As a result, with the new detector in the acquired dual-energy detector data (to be evaluated for the derivation of an associated X-ray image), compared to those of a detector with the conventional arrangement and alignment to the X-ray generator or reference X-ray beam, pairs of Hi- and/or Lo-detector data can no longer be assigned 1:1, i.e., exclusively to exactly one image point. I.e., at the place of a Lo-detector element a clearly 1:1 assignable Hi-detector element is missing and vice versa.

By "area centroid of the detector line" is meant here the geometric centroid of the geometric figure formed by the effective areas of one type of the detector elements, whose area centroid corresponds to the averaging of all points within this figure. The centroid of the area of the detector line or of the reference detector element of the detector line can be determined, in the case of detector lines which in practice usually have a rectangular shape, as the intersection of the lines bisecting the effective area of the detector line in the longitudinal and width directions, or generally calculated mathematically by integration.

The inventor has recognized that the missing detector data for each real Hi- and/or Lo-detector datum of one type due to the effective offset of the Hi- and/or Lo-detector elements which can no longer be assigned to each other 1:1 can be supplemented with virtual detector data of the other type calculated for this location. That is, based on the predetermined effective overlapping offset between the Hi-detector elements of the Hi-detector line and the Lo-detector elements of the Lo-detector line, virtual detector data can be calculated with sufficient accuracy for the locations of the missing detector elements as replacements. The calculation has been found to be surprisingly implementable and the X-ray images derived from the real and virtual detector data to be a practical improvement.

According to a first aspect, there is provided a line-shaped dual-energy X-ray detector (hereinafter referred to as detector for short) for use in an X-ray inspection apparatus (for example, an X-ray inspection apparatus according to the second aspect described below) configured to perform a method of dual-energy X-ray radiography of an inspection object.

In the context of the detector proposed herein, "line-shaped" should initially be understood to mean that the detector is configured to acquire detector data for a plurality of image points in the longitudinal direction of the detector and for a lesser number of image points, but at least one image point, orthogonal to the longitudinal direction. In the simplest implementation, the detector thus has two detector lines, each with an equal number of Hi(gh)- and Lo(w)-detector elements in the longitudinal direction, each with a single Hi- and a single Lo-detector element orthogonal thereto. In principle, the detector may also have multiple Hi-detector elements and Lo-detector elements in the direction orthogonal to the longitudinal direction; the principles proposed herein are then applicable accordingly.

The line-shaped detector proposed herein has at least: A first detector line with first detector elements and a second detector line arranged parallel thereto with second detector elements. The detector lines are configured to respond differently spectrally selectively to the spectrum of X-rays to be detected. The detector lines are arranged parallel to each other in line direction. The detector lines are arranged one behind the other in the direction of the X-rays to be detected in such a way that the projection of the first and the second detector lines in the direction of one of the X-rays to be detected as a reference X-ray beam are offset overlapping each other. The projection of the first and second detector lines may be in the direction of one of the X-rays to be detected passing through the area centroid of a reference detector element of the first or second detector line. The reference X-ray may be the X-ray passing through the area centroid of the entirety of the effective areas of the detector elements of the foremost detector line with respect to the X-rays to be detected, or the X-ray passing through the area centroid of the effective areas of a reference detector element of the foremost detector line with respect to the X-rays to be detected.

The first detector line may have associated first or Lo(w) detector elements for primarily detecting low energy X-rays and the second detector line may have associated second or Hi(gh) detector elements for primarily detecting high energy X-rays.

The Lo- and the Hi-detector elements may be configured to generate respective associated Lo-detector data or Hi-detector data. In principle, the Lo- and the Hi-detector elements could be essentially the same, if only because a Lo-detector element is usually located closer to the X-ray source and therefore absorbs more low-energy quanta than an underlying Hi-detector element. Thus, the superposition of the Lo-detector and Hi-detector elements already results in a (small) splitting of the X-ray spectra. For an amplification of the splitting, a filter material for hardening (i.e., filtering of the low-energy X-rays) can additionally be arranged between the first and second detector elements.

In a first implementation, the first detector line and the second detector line are offset from each other in the line direction by a first (local) offset. With this first embodiment, an increase in the spatial resolution of the X-ray images to be derived in the line direction (i.e., transverse to the scanning direction) can be achieved.

In a second implementation, the first detector line and the second detector line are offset from each other by a second (local) offset orthogonal to the line direction. With the second implementation, an increase in the spatial resolution of the X-ray images to be derived orthogonal to the line direction (i.e., in the scanning direction) can be achieved. As a result, with the second implementation, the spatial resolution of the X-ray images to be derived can be increased in the scanning direction without having to reduce the transport speed or the ratio of transport speed and scanning frequency for the inspection object. In an alternative application of the second implementation, the transport speed or the ratio of transport speed and scanning frequency for the inspection object and correspondingly the throughput at the X-ray inspection apparatus can be increased while the spatial resolution of the derived X-ray image remains the same. Combinations of both effects are also possible with the appropriate configuration.

The first and second implementations can be used alternatively or complementarily, i.e., simultaneously.

Alternatively or in addition to the first and second implementations described above, in which the first and second detector lines are (locally) offset from each other, in a third implementation the first and second detector lines may also be tilted with respect to the reference X-ray beam by a corresponding tilt angle to achieve the effective offset.

The desired effective offset can also be achieved in this way with a conventional detector in which the first and second detector elements can be clearly assigned 1:1—i.e., are not locally offset from one another. It is of course possible to use the third implementation in combination with the first and/or the second implementation in order to achieve the effect of the respective other implementation; i.e., the third implementation can be used to achieve the effect of both the first and the second implementation.

Regarding the third implementation, it should be noted that in the conventional detector, the first and second detector lines are usually arranged in series such that a connecting line between a Lo-detector element and the associated Hi-detector element points exactly to the focal spot of the associated X-ray generator aligned with the detector. Since the Lo- and Hi-detector elements arranged one behind the other have a predetermined distance (e.g., of about 1 cm) from each other as seen from the X-ray beam generator, the entire detector can be easily tilted by a suitable angle of inclination (for example, by 5°-6°) with respect to the reference X-ray beam in the direction of the longitudinal direction of the detector and/or orthogonal thereto. This inclination of the detector causes the connecting line between the area centroids of a pair of a Hi-detector element and a Lo-detector element to pass by the X-ray generator.

For example, when the detector is tilted longitudinally, the tilt may be particularly adjusted so that the line connecting the area centroid of a Lo-detector element and the gap between two adjacent Hi-detector elements points toward the X-ray generator.

For example, when the inclination is orthogonal to the longitudinal direction of the detector, the inclination can be particularly adjusted so that the connecting line between the area centroid of a Lo-detector element and the edge of a Hi-detector element located behind it points to the X-ray generator.

Thus, with the third implementation, basically the same effect (hence "effective offset") can be produced as with the linear (local) offset of the first and second detector lines in the longitudinal direction of the detector and/or orthogonal to the longitudinal direction to each other.

As a result, with the first, second and third implementations explained above, a required effective offset between the first and second detector elements may be achieved to achieve any of the effects described above, or a combination thereof.

In particular, with all three implementations or combinations thereof, the effective offset can be adjusted such that, in operation, for detector pairs formed from a real detector element and a calculated virtual detector element, the line of connection through the associated area centroids of the two detector elements is aligned with the X-ray generator, i.e., focused on the focal spot of the generator.

At this point it should be noted for the following description that in practice an I-, L- or U-shaped detector line in an X-ray inspection apparatus may be formed by a plurality of individual line-shaped detectors, each of which is individually aligned with respect to a reference X-ray beam on the respective associated X-ray generator of the apparatus. Therefore, the projections of the first and second detector lines along the reference X-ray beam in the third implementation are in practice already shifted against each other (by about 14-15%) at least at the detector line ends due to the geometry. Therefore, it is recommended that the overlap between the detector elements of the first and the second detector line is at most 80% and at least 20%.

The first detector elements and the second detector elements may have substantially the same cross-sectional shape and cross-sectional area (effective area) in the direction of the X-rays to be detected. In other words, a first detector element and a second detector element may be brought into congruence for a conventional arrangement arranged one behind the other.

The "effective area" of a detector element is understood here to be the effective area of the detector element on which the X-rays to be detected, which have passed through the inspection object, are incident in the intended arrangement.

The first detector elements and the second detector elements each have a length in line direction and a width orthogonal thereto.

In a first implementation, the first offset in the line direction corresponds to half the length of the first and second detector elements. As a result, the first implementation provides a detector with twice the spatial resolution in line direction.

In a second implementation, the second offset is determined based on the readout frequency f in [1/s] for reading out the detector data from the detector elements and the transport speed b in cm/s of an inspection object relative to the dual-energy X-ray detector according to formula (1):

$$\Delta z = (m\ b)/(2\ f) \tag{1},$$

where m is an odd integer (m=1, 3, 5, 7, . . . ).

As a result, the second implementation provides a detector with twice the spatial resolution perpendicular to the line direction with an unchanged ratio of the transport speed of the inspection object past the detector and the readout frequency of the detector elements. Alternatively, with a detector according to the second implementation, the scanning speed for inspection objects in the X-ray inspection apparatus with the detector could be correspondingly reduced, possibly halved, while maintaining the same spatial resolution. I.e., with the setup according to the second implementation, optionally higher belt speeds with constant image quality or improved spatial resolution with constant belt speed are possible. In principle, the ratio of belt speed to scanning frequency can be adjusted as required. In the second implementation, if the belt speed and the sampling frequency are kept the same, the spatial resolution is improved with the new detector. If the belt speed is kept constant and the sampling frequency is reduced, then the resolution remains unchanged, but the signal-to-noise ratio is improved so that, for example, fine structures such as thin wires are better resolved in the X-ray image. If the scanning frequency is kept the same and the belt speed is increased, the resolution also remains unchanged, but the throughput of inspection objects per unit time at the system is increased. The second implementation thus offers a particularly high degree of flexibility, allowing systems to be designed for different requirements.

Without an offset of the detectors, a baggage item travels a distance of $\Delta s = b/f$ on the conveyor belt between two readout processes and value pairs of the form $((Lo_1, Hi_1), (Lo_2, Hi_2), \ldots, (Lo_N, Hi_N))$ are generated from the measured values $Lo_1, Hi_1, Lo_2, Hi_2, Lo_n, Hi_n, \ldots, Lo_N, Hi_N$.

With an offset $\Delta z = (m\ b)/(2\ f)$ and m=1, the spatial resolution can be doubled in the conveying direction, as described above, because intermediate values are generated at a distance of $\Delta s/2$. The value pairs in this case are of the form $((Lo_1, vHi_1), (vLo_1, Hi_1), (Lo_2, vHi_2), (vLo_2, Hi_2) \ldots, (Lo_N, VHi_N), (vLo_N, Hi_N))$. At half the belt speed (or double the readout frequency), $\Delta s$ is halved and this leads, with the same offset $\Delta z$, to the fact that detector data are still generated in the order $Lo_1, Hi_1, Lo_2, Hi_2, Lo_n, Hi_n, \ldots, Lo_N, Hi_N$, but now $Lo_1$ and $Hi_2$ are spatially congruent. The measured values can now be combined accordingly, for example in the form $((Lo_2, Hi_1), (Lo_3, Hi_2), \ldots, (Lo_N, Hi_{N-1}))$, so that one can do without a calculation of intermediate values. That is, in such an application of the second implementation, the spatial offset between associated first and second detector data due to serial readout can be compensated by the clever combination of spatial offset of the detector elements orthogonal to the line direction and the ratio of readout frequency and belt speed.

As noted above, (depending on the target direction) the two implementations may be used independently or in combination. As also noted above, the third implementation can be used alternatively or in addition to the first and/or second implementation with according to the effects and possible applications explained above.

Thus, in the first or corresponding third implementation, the high-energy Hi-detector elements and low-energy Lo-detector elements are effectively shifted by half a detector element compared to the conventional arrangement. In the alternative or additional second or corresponding third implementation, the ratio of readout frequency to belt speed and, correspondingly, the effective ratio in the transport or scan direction can be adjusted as needed as noted above.

Although the Hi-detector elements and the Lo-detector elements are configured to respond differently (spectrally selectively) to the incident X-rays to be detected, due to the defined effective offset of the Hi-detector elements and the Lo-detector elements in the line direction and/or orthogonal to the line direction, it is possible to adjust the readout frequency and the band speed as required, as well as the known ratio of readout frequency and belt speed, the Hi-detector data missing to a real Lo-detector element can be calculated as virtual Hi-detector data based on the acquired adjacent real Hi- and/or real Lo-detector data, if required. Possibilities for a concrete procedure are explained further below in connection with the method according to the third aspect for processing first and second detector data obtained with the detector of the first aspect.

With respect to the realization of the first detector elements and the second detector elements, it should be noted that in principle the first and second detector elements may be constructed in a manner known per se for the required spectral selectivity for a spectrum of X-rays used. For example, the first and second detector elements may each include a photodiode in front of which a scintillator material is disposed with respect to the incident X-rays to be detected. The scintillator material may be selected to adjust the required spectral selective sensitivity for X-rays of the spectrum used and/or may be appropriately dimensioned in the thickness to be traversed by the X-rays. For example, YAG (yttrium aluminum garnet), YGAG (yttrium gadolinium aluminum garnet), GOS (gadolinium oxysulfide), or materials physically similar to X-rays can be used as scintillator materials. For a low-energy scintillator, layer thicknesses on the order of less than 1 mm may be set, and for a high-energy scintillator, second layer thicknesses on the order of greater than 1 mm may be set. The light quanta generated by the incident X-rays in the respective scintillator material are detected by the associated photodiode and converted into an output voltage which depends on the time interval after which the output signal generated by the photodiode is read out in each case. The output signals read out regularly in this way correspond to the associated detector data.

Between the first detector elements as Lo-detector elements and the second detector elements, a filter for hardening the incident X-rays, for example made of copper, titanium, aluminum or the like, can additionally be arranged, which attenuates low-energy X-rays particularly strongly, so that the second detector elements are reached predominantly by high-energy X-rays and are thus Hi-detector elements.

The first and second detector elements may be arranged on the same side of a carrier according to one of said first and second implementations, or a combination thereof, to form the detector proposed herein. Alternatively, the first detector elements may be located on one side of the carrier and the second detector elements may be located on the other side of the carrier. For example, a printed circuit board (PCB) can be used as a carrier, on which the conductor tracks and, if necessary, functional electronics for contacting and reading out the detector elements are located.

Compared to the conventional design of known dual-energy detectors, the predetermined effective overlapping offset between the Hi- and Lo-detector elements located one behind the other in the direction of the X-rays to be detected is achieved with the same system costs.

The dual-energy detector proposed herein achieves higher spatial resolution without having to increase the number of Hi- and Lo-detector elements per unit length or unit area.

The dual-energy detector proposed herein has a better signal-to-noise ratio compared to a setup using detector elements with a smaller effective area to increase the number of Hi- and Lo-detector elements per unit length or unit area.

The dual-energy detector proposed here has a particular simplicity. In principle, no extensive modifications to existing detectors are necessary to put the concept into practice. In principle, the Hi- and Lo-detector elements need to be shifted by the desired predetermined effective overlapping relative offset, for example by half a length and/or width of a detector element.

A second aspect of the present disclosure provides an X-ray inspection apparatus including the dual-energy line-scan X-ray detector (detector) according to the first aspect.

The X-ray inspection apparatus is configured for transporting an inspection object in a transport direction through the inspection apparatus. The line direction of the dual-energy X-ray detector may be arranged orthogonal to the transport direction, such that the transport direction corresponds to the scanning direction for the inspection object. The X-ray inspection apparatus provides acquired first detector data in the form of Lo-detector data and second detector data in the form of Hi-detector data of the inspection object.

The X-ray inspection apparatus of the second aspect can perform dual-energy X-ray radiography imaging for non-destructive inspection of the inspection object and provide Lo- and/or Hi-detector data describing the inspection object. The Lo- and Hi-detector data are based on the detection of the X-rays radiographing the inspection object with the dual-energy X-ray detector of the first aspect. For this purpose, the inspection object is passed at a predetermined or optionally set transport speed through a scanning arrangement including the line-shaped detector arranged orthogonally to the transport line and an X-ray fan aligned with the detector line for the corresponding line-by-line scanning with a likewise predetermined or optionally set readout frequency of the detector elements through the X-ray fan. As mentioned above, the ratio of belt speed and readout frequency can be adjusted as required (high throughput or higher spatial resolution).

For the following description, the detector data acquired and provided by the detector are indexed by a location variable n, which runs in the line direction of the detector starting at one end. The first detector elements, i.e., the Lo-detector elements, acquire first real detector data, i.e., real Lo-detector data $Lo_1, Lo_2, Lo_n, \ldots, Lo_N$ of the inspection object, where $1 \leq n \leq N$ and N is the number of Lo-detector elements in the line direction of the detector. The second Hi-detector elements, i.e., the Hi-detector elements, acquire corresponding second real Hi-detector data, i.e., real Hi-detector data $Hi_1, Hi_2, Hi_3, Hi_N$ of the inspection object, where also $1 \leq n \leq N$ holds, and N is the number of detector elements in the line direction of the detector.

The inventor has further found that a similar effect on the achieved spatial resolution or the ratio of transport speed and readout frequency of the detector elements, as can be achieved with the second or corresponding third implementation of the detector according to the first aspect, can also be achieved in an X-ray inspection apparatus with a conventional detector by means of a certain readout pattern for the Hi- and/or Lo-detector data at the conventional dual-energy X-ray detector. I.e., the following readout method uses a dual-energy X-ray detector line with one high-energy Hi-detector element and one low-energy Lo-detector element per pixel, which are arranged substantially in the same orientation one above the other in the direction of the X-rays to be detected.

For a detailed description of the readout procedure, the real readout Hi- and/or Lo-detector data of the first and second detector line are indexed as already explained above: Hi or Lo stand for a respective Hi-detector datum with the location variable n=1, 2, 3, . . . . N for the respective position of the associated detector element in the detector line, where $1 \leq n \leq N$ and N is the number of detector elements of the associated type (Hi or Lo) in the line direction.

The inventor has found that with a readout sequence in which initially all detector elements of one type (Hi or Lo) are read out along the location variable n and then all other detector elements of the other type are read out along the location variable n, i.e., initially all Hi-detector data $Hi_1, Hi_2, Hi_3, \ldots, Hi_N$, and then all Lo-detector data $Lo_1, Lo_2, Lo_3, \ldots Lo_N$ (or vice versa), the same result can be achieved as can be achieved by shifting the first and second detector lines with respect to each other according to the second implementation. Thus, the foregoing readout method is an equivalent software solution to the hardware solution with Hi-detector elements and Lo-detector elements effectively offset overlapping each other according to the second and/or correspondingly configured third implementation of the first aspect.

Thus, a further aspect of the present disclosure relates to a readout method for Hi- and Lo-detector elements of a dual-energy X-ray detector and likewise to an X-ray inspection apparatus having the features of the X-ray inspection apparatus of the second aspect but the conventional detector described below, which includes at least one dual-energy X-ray detector line having, per pixel, in each case one high-energy Hi-detector element and one low-energy Lo-detector element which are arranged substantially congruently (1:1) above one another in the direction of the X-rays to be detected, the Hi- and/or Lo-detector data of the detector line to be read out being defined as $Hi_n$ or $Lo_n$ for a respective Hi- and/or Lo-detector datum with the location variable n=1, 2, 3, . . . N for the respective position of the associated detector element in the detector line, where $1 \leq n \leq N$ and N is the respective number of Hi- and Lo-detector elements in the line direction, the read-out method including: Reading out the Hi- and Lo-detector elements such that initially all detector elements of one type are read out along the location variable n, and subsequently all other detector elements of the other type are read out along the location variable n.

A third aspect of the present disclosure relates to a method of processing Lo-detector data and Hi-detector data provided by the X-ray inspection apparatus of the second aspect, or the conventional detector X-ray inspection apparatus described above and the readout method described above, so that an X-ray image having an improved spatial resolution can be derived from the processed detector data.

As noted herein, Hi- and/or Lo-detector data for individual pixels acquired with the detector of the first aspect or the X-ray inspection apparatus of the second aspect or an X-ray inspection apparatus having a conventional detector and the readout method described above no longer has a direct 1:1 relationship. However, the inventor has found that due to the predetermined overlapping offset between the Hi- and Lo-detector elements, for example, the Hi-detector datum missing from a real Lo-detector element can be calculated as a virtual Hi-detector datum and, correspondingly, the Lo-detector datum missing from a real Lo-detector element can be calculated as a virtual Lo-detector datum.

The method of the third aspect basically includes: Calculating a respective virtual Lo-detector datum at the position of a real Hi-detector element. It is understood that alternatively or supplementally, a respective virtual Hi-detector datum may also be calculated at the position of a real Lo-detector element.

For example, calculating a virtual Lo-detector datum at the position of a real Hi-detector element may include: Calculating the virtual Lo-detector datum based on a certain first number of adjacent real Lo-detector data and a certain second number of adjacent real Hi-detector data. Accordingly, the alternative computing of a virtual Hi-detector datum may include at the position of a real Lo-detector element: Calculating a virtual Hi-detector datum based on a certain first number of adjacent real Hi-detector data and a certain second number of adjacent real Lo-detector data.

The inventor has found that various approaches are possible for calculating the virtual Hi- and/or Lo-detector data, which may be used alone or in combination.

For example, a virtual Lo- and/or Hi-detector datum may be calculated based on a mean or median of adjacent Hi- and/or Lo-detector data. For example, the Hi-detector datum missing from a Lo-detector element may be calculated as a virtual Hi-detector datum according to a first approach as follows: Based on a certain first number (e.g., two) of immediately adjacent real Hi-detector data (i.e., e.g., the detector data of the two Hi-detector elements that overlap with the Lo-detector element, i.e., are adjacent to it in the line to the left and to the right) and a certain second number (e.g., three) of nearest real Lo-detector data (i.e., e.g., the detector data of the Lo-detector element under consideration and the two Lo-detector elements adjacent thereto on the left and right).

For example, a virtual Lo-detector datum can be calculated considering the behavior of the values of the Hi-detector data and/or a virtual Hi-detector datum can be calculated considering the behavior of the values of the Lo-detector data.

The above approaches may be implemented using a machine learning algorithm. For example, the virtual Hiand/or Lo-detector data may be generated based on the provided Lo- and/or Hi-detector data using a deep learning algorithm.

Surprisingly, the inventor has found that an approach from the field of processing image data from a digital image sensor with a so-called Bayer color filter is suitable for calculating the virtual detector data. In the case of an optical image sensor with a Bayer color filter, the color information missing at the location of a pixel can be calculated by means of a so-called demosaicking algorithm (i.e., a mosaic removal algorithm). Such an algorithm is described, for example, in: "Color filter array demosaicking using high-order interpolation techniques with a weighted median filter for sharp color edge preservation" by J. S. J. Li and S. Randhawa, IEEE Transactions on image processing, Vol. 18, No. 9, September 2009; for reference, the document is hereafter abbreviated Li/Randahawa and its contents are incorporated by reference.

In an image sensor with Bayer color filters, the filter elements for the primary colors red, green, and blue of the color filter are arranged as a so-called Bayer matrix (or Bayer pattern) (cf. FIG. 1 in Li/Randahawa), in which the individual color filters are arranged in a checkerboard fashion, with 50% of the filter elements being green and 25% each of the filter elements being red and blue. The "Bayer matrix" and the "Bayer filter" are named after their inventor Bryce E. Bayer and are described, for example, in U.S. Pat. No. 3,971,065 A.

To apply this approach, the detector data acquired and provided by the dual-energy X-ray detector of the first aspect are processed via the aforementioned location variable n, which runs in the line direction of the dual-energy X-ray detector starting at one end, indexed such that the Lo-detector elements represent real Lo-detector data $Lo_1$, $Lo_2, \ldots, Lo_n, \ldots, Lo_N$ of the inspection object and the Lo-detector elements detect corresponding real Hi-detector data $Hi_1, Hi_2, \ldots, Hi_n, \ldots, Hi_N$ of the inspection object, where $1 \leq n \leq N$ and N is respectively the number of Hi- and/or Lo-detector elements in the line direction of the dual-energy X-ray detector.

The real Hi- and Lo-detector elements of the dual-energy X-ray detector are read out in pairs in the order $Hi_1, Lo_1$, $Hi_2, Lo_2, \ldots, Hi_n, Lo_n \ldots, Hi_N, Lo_N$, where multiple orders read out in this way form a two-dimensional Hi/Lo matrix. Depending on how the offset was actually implemented with respect to the readout direction of the detector elements, the above sequence can also start with the element $Lo_1$ and then end with the element $Hi_N$.

The virtual Hi- and/or Lo-detector data can be computed using an adapted demosaicking algorithm, for example the algorithm described in Li/Randhawa.

To suitably adapt the demosaicking algorithm, for example the algorithm described in Li/Randhawa, the Bayer pattern underlying the algorithm described there, which has three colors, is initially reduced to a two-color checkerboard pattern and one color of the checkerboard is assigned to the Hi-detector data and the other color of the checkerboard is assigned to the Lo-detector data.

Then, the demosaicking algorithm adapted to the checkerboard pattern is correspondingly applied to the 45° rotated two-dimensional Hi-/Lo matrix with the acquired real Hi- and Lo-detector data to calculate virtual detector datum associated with each real detector datum.

A fourth aspect of the present disclosure relates to a processing apparatus for processing Lo-detector data $Lo_1$, $Lo_2, Lo_3, \ldots, Lo_N$ and Hi-detector data $Hi_1, Hi_2, Hi_3, Hi_N$ provided by the X-ray inspection apparatus of the second aspect, the processing apparatus being configured to perform a method of the third aspect.

A fifth aspect of the present disclosure relates to a system including an X-ray inspection apparatus of the second aspect and the processing apparatus of the fourth aspect, wherein the X-ray inspection apparatus is configured to provide the Hi- and/or Lo-detector data based on scanning an inspection object to the processing apparatus and is connected to the processing apparatus for corresponding data communication thereto.

A sixth aspect of the present disclosure relates to a computer program product, including software means for implementing a method of the third aspect when the computer program is implemented on a computer, such as the processing apparatus of the fourth aspect. That is, a computer program product including instructions that, when the computer program is implemented by a computer, in particular a processing device according to the fourth aspect, cause the computer program to perform the method according to the third aspect.

A seventh aspect of the present disclosure relates to a computer readable medium including a computer program product of the sixth aspect.

An eighth aspect of the present disclosure relates to a data stream including electronically readable control signals that can interact with a programmable computer such that, when the computer executes the electronically readable control signals, the computer performs a procedure of the third aspect. That is, a data carrier signal that transmits the computer program product of the sixth aspect.

BRIEF DESCRIPTION OF THE DRAWINGS

Further advantages, features and details of the here proposed solution(s) will be apparent from the following description, in which embodiments are described in detail with reference to drawings. In this connection, the features mentioned in the claims and in the description may each be essential individually or in any combination. Likewise, the features mentioned above and those further elaborated herein may each be used individually or in any combination. Functionally similar or identical parts or components are partly provided with the same reference signs. The terms "left", "right", "top" and "bottom" used in the description of the embodiments refer to the drawings in an orientation with normally readable figure designation or normally readable reference signs. The embodiments shown and described are not to be understood as conclusive but have an exemplary character for explaining the solution proposed here. The detailed description is for the information of the person skilled in the art, therefore known structures and procedures are not shown or explained in detail in the description, in order not to complicate the understanding of the description.

FIG. 1b is a cross-sectional view of the section through the xy plane of the detector of FIG. 1a.

FIG. 2b is a cross-sectional view of the section through the xy plane of the detector of FIG. 2a.

DETAILED DESCRIPTION

Figure 1A:
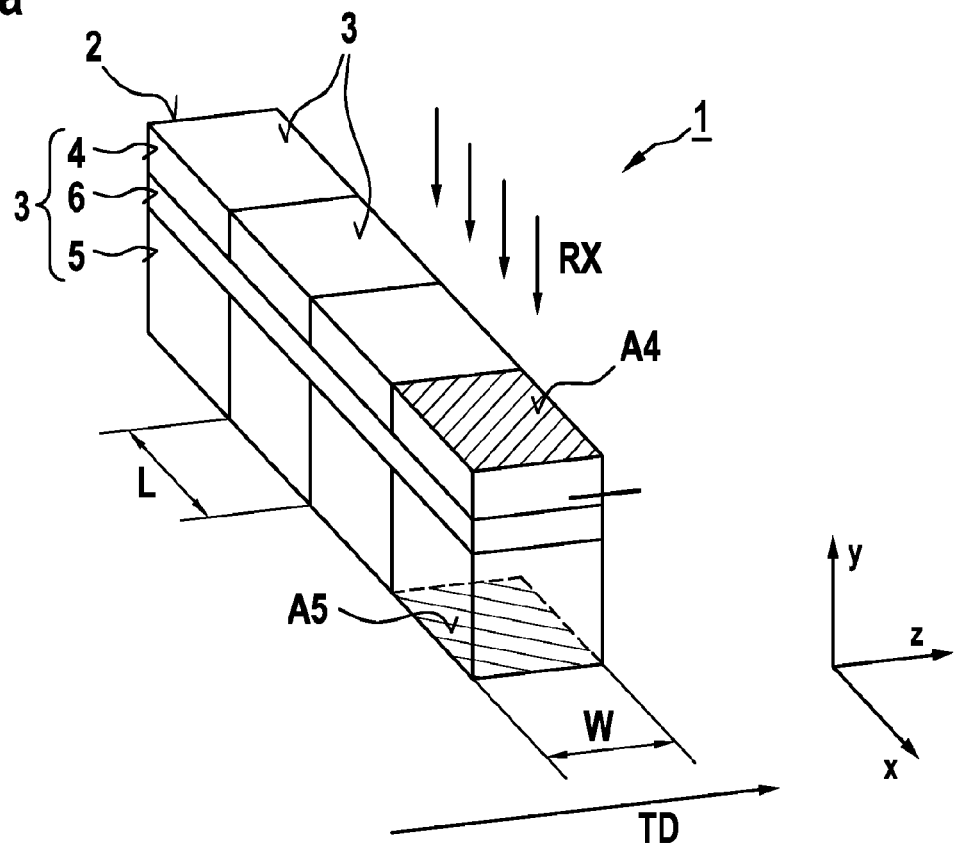
FIG. 1a is a simplified perspective view of the structure of a conventional dual-energy detector.

Dual-energy X-ray radiography is based on the fact that the attenuation coefficient is a material property of the material being radiated through. By scanning an inspection object using X-rays, a grayscale image is initially obtained in which the gray level of a pixel corresponds to the respective measured intensity of the X-rays. By comparing the intensity of the X-rays used with the intensity measured at the image point, the attenuation coefficient of the material irradiated through there can be determined. The attenuation coefficient is a function of the nuclear charge number and the density of the irradiated material as well as the original energy of the used X-rays. If the inspection object is spectrally selectively scanned twice, e.g., with spectrally different X-ray energies, the dependence on the material density can be eliminated from the corresponding equations.

In order to perform the required two spectrally selective measurements simultaneously, so-called dual-energy detectors with a structure that essentially has two spectrally selective energy channels have become established. Such a detector thus simultaneously provides Hi(gh)-detector data caused by high-energy X-rays and Lo(w)-detector data caused by low-energy X-rays of a radiographed inspection object. With the difference in the magnitudes between the Lo- and the Hi-detector data, the nuclear charge number (also atomic number, proton number) of the material radiographed there or the effective nuclear charge number of the materials radiographed there in an inspection object can be inferred for each image point (pixel) corresponding to a detector element.

Organic materials largely have an atomic number of about 10 or less and metallic materials have an atomic number of more than 10. The materials in an inspection object can thus be classified according to the determined effective atomic number and, for optical material discrimination, the pixels in a displayed X-ray image can be colored accordingly. This principle is used, for example, in the visual evaluation of X-ray images of baggage at airport checkpoints, in that inspection apparatuses color image pixels with predominantly organic compounds orange, with predominantly metallic material blue and with a mixture of organic and metallic green in displayed X-ray images for optical material discrimination to the operating personnel.

The following description of FIGS. 1*a* to 6 should be preceded by the fact that an xyz coordinate system is indicated in the Figures for orientation and mutual reference. According to the respective xyz coordinate system, the longitudinal direction of the displayed detector lines always runs in the x-direction, while the direction of the X-rays to be detected incident on the detector elements RX (shown simplified as an arrow bundle) runs in the y-direction and, when using the detector lines, a direction corresponding to the scanning direction runs orthogonal to the detector line in the z-direction. The scanning direction usually corresponds to the transport direction TD of an inspection object past the detector line and through an X-ray inspection apparatus (as simplified in FIG. 6). I.e., the longitudinal direction (x-direction) of the detector proposed herein is typically arranged transverse to the scanning direction (z-direction) in use.

It should be noted that the representation of the detector used here is a simplification compared to the U- or L-shaped detector lines commonly used in practice. In case of a U- or L-shaped detector line and a fan-shaped X-ray fan aligned to it, the detector line does not run exclusively in the transport plane of the inspection objects. But the legs of the detector line always run orthogonal to the detected X-rays and also orthogonal to the transport or scanning direction z. Thus, the considerations made here for an I-shaped detector line running only in the xz-plane can be easily transferred to the U- and L-shaped detector lines used in practice.

Figure 1B:
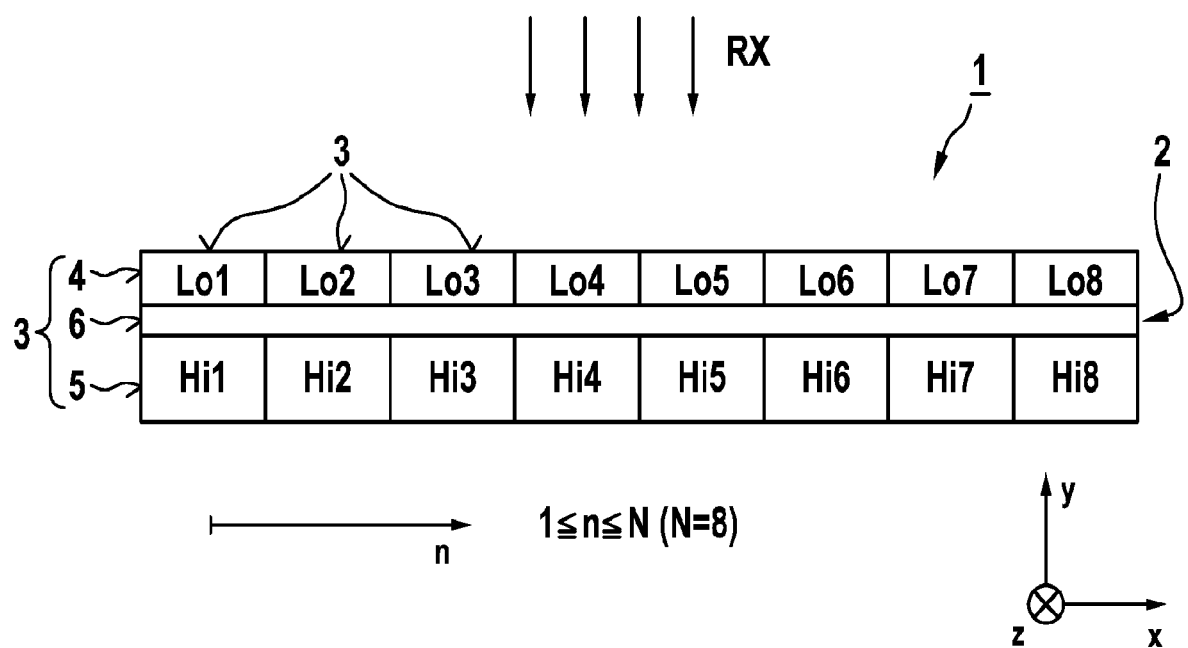

FIGS. 1*a* and 1*b* illustrate the construction of a conventional dual-energy X-ray detector 1 (hereinafter referred to as detector 1) in the form of a section of a detector line 2. FIG. 1*a* is a simplified perspective view of the detector 1 and FIG. 1*b* is, for the purpose of illustrating the construction, a projection of a detector 1 of FIG. 1*a* onto the xy plane.

The detector line 2 includes dual-energy detector elements 3 arranged side by side; for clarity, only four such elements are shown, although in reality the number is usually higher (e.g., 1,000). For this purpose, each detector element 3 includes low-energy Lo(w)-detector elements 4 and high-energy Hi-(gh)-detector elements 5, respectively, which are sandwiched with respect to X-rays RX to be detected with a filter layer 6 (e.g. made of copper) in between. During the scanning of an inspection object, the Lo-detector elements 4 generate Lo-detector data which are mainly due to low-energy X-rays RX, while the Hi-detector elements 5 generate Hi-detector data which are due to high-energy X-rays RX. The detector 1 thus has at least two output channels: one at which the Hi-detector data is provided and one at which the Lo-detector data is provided.

The effective area A4 of the Lo-detector elements 4 and the effective area A5 of the Hi-detector elements 5 are essentially the same size. The effective areas of the Lo-detector elements 4 and the Hi-detector elements 5 have a length L in the line direction (i.e., longitudinal direction of the detector line 2) and a width W orthogonal thereto.

For example, the effective area of a detector element may be 0.8 mm (length L in the line direction) times 0.8 mm (width W across the line direction). For example, a typical detector line may be 80 cm in total in the line direction, so that the line includes approximately 1,000 detector elements. In principle, the dimensions of the detector elements are within a technically reasonable range and the length of the detector line is freely selectable.

In use, the detector line 2 is usually arranged transversely to a transport direction TD for an inspection object, so that the inspection object can be scanned line by line with the X-rays RX. The detector 1 can in principle include several detector lines 2. That is, with the detector 1 of FIGS. 1a and 1b, by means of a single line-by-line scanning of an inspection object, a low-energy X-ray image based on the transmission of low-energy X-rays and a high-energy X-ray image based on the transmission of high-energy X-rays can be acquired simultaneously.

FIG. 1b additionally illustrates the real Hi-detector data $Hi_1$, $Hi_2$, $Hi_3$, . . . , $Hi_N$ and Lo-detector data $Lo_1$, $Lo_2$, $Lo_3$, . . . , $Lo_N$ provided by the individual detector elements 4 and 5. For a detailed description of the processing procedures for the real detector data explained in the description below, as well as the associated readout procedures, the real readout Hi- and/or Lo-detector data are indexed along the detector line 2: Hi or Lo classifies a respective Hi-detector datum or Lo-detector datum indexed with the location variable n=1, 2, . . . , N for the respective position of the associated detector element in the detector line 2, where 1≤n≤N and N is the number of detector elements of the associated type (Hi or Lo) in the line direction. In the highly simplified example in the FIG. 1b, N=8, i.e., the detector line 2 includes 8 Hi-detector elements and Lo-detector elements arranged along the detector line.

Figure 6:
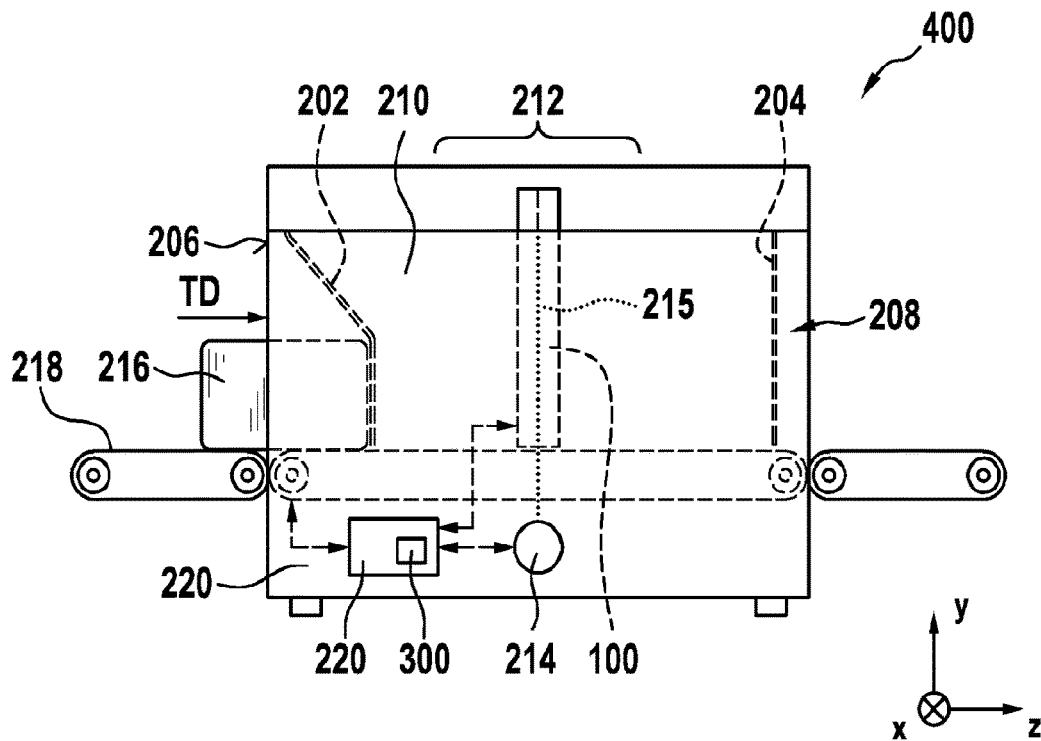
FIG. 6 is a simplified side view of an X-ray inspection apparatus using a dual energy X-ray detector proposed herein, such as a detector of FIGS. 2*a*-5.
Figure 7:
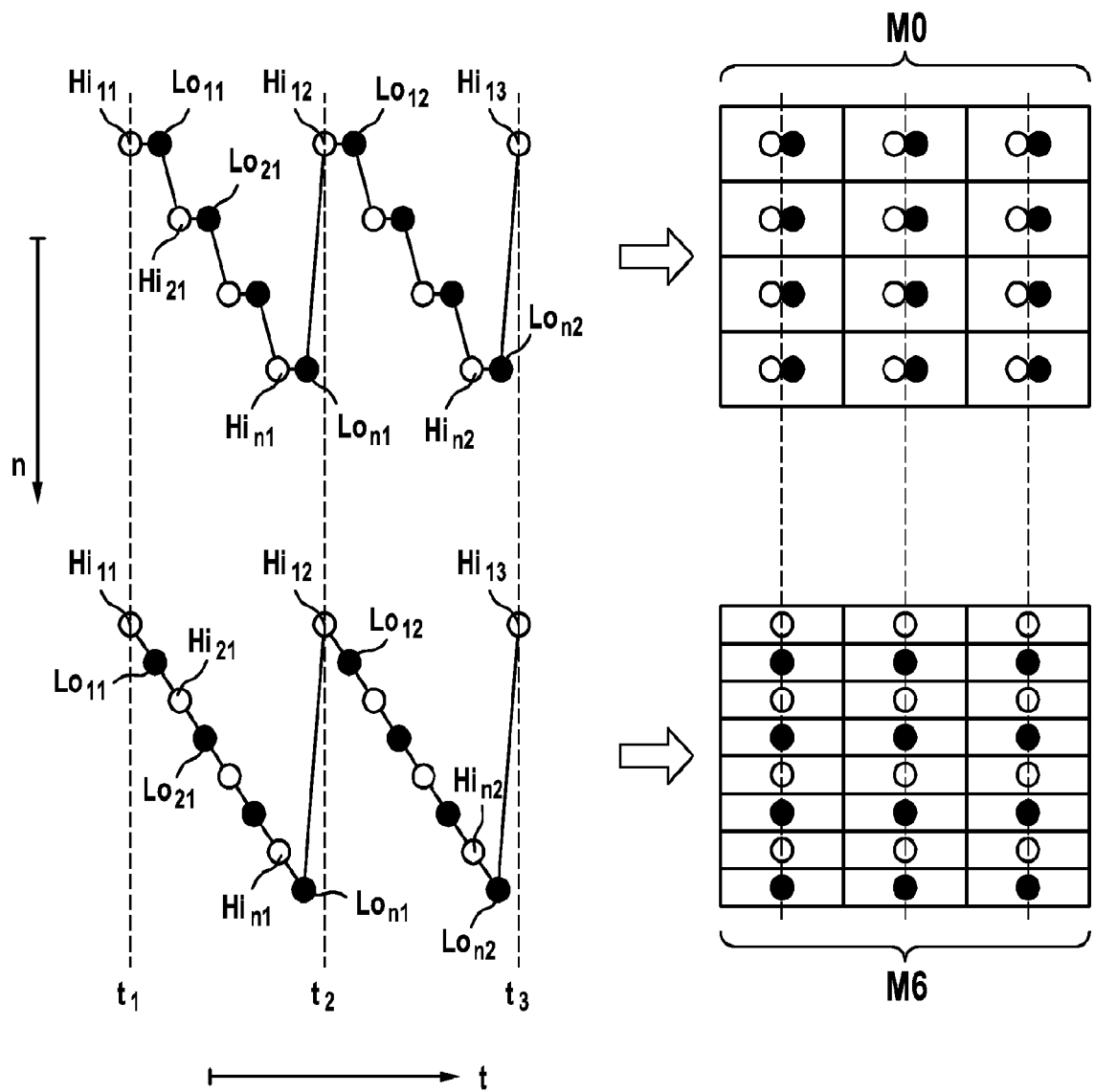
FIG. 7 illustrates the detector data readout situations for a detector of FIGS. 1*a* and 1*b* as reference (FIG. 7 top) and of FIGS. 2*a* and 2*b* (or 5) according to the first implementation (FIG. 7 bottom).
Figure 8:
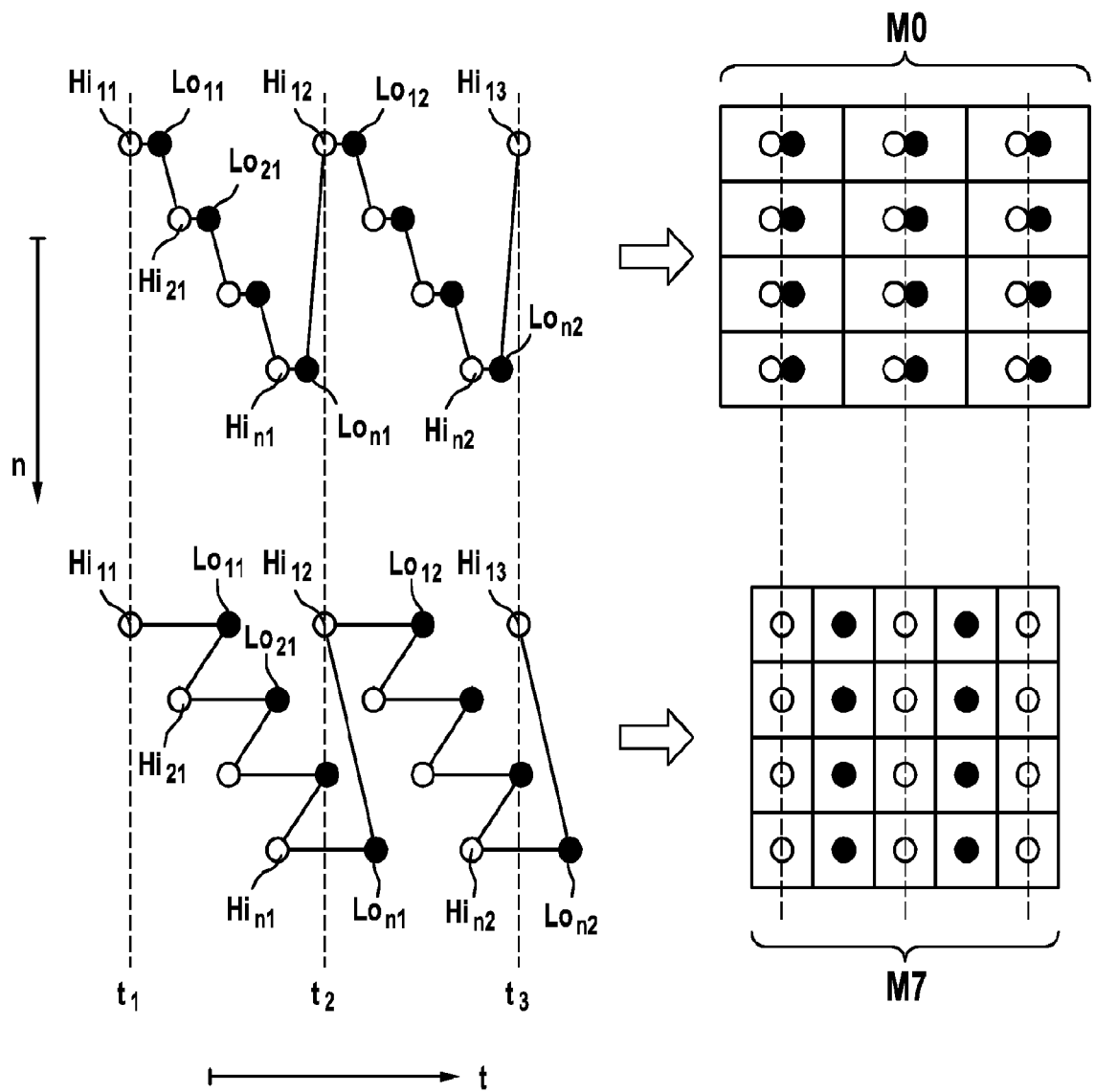
FIG. 8 illustrates the detector data readout situations with a detector of FIGS. 1*a* and 1*b* as reference (FIG. 8 top) and of FIG. 3 with a dual-energy X-ray detector according to the second implementation (FIG. 8 bottom).

The usual readout for providing the Hi- and/or Lo-detector data acquired with the detector 1 is illustrated in the left part of FIGS. 6-8, respectively, in the direction of travel of the location variable n along the detector line and over time t.

FIGS. 2a-4 each illustrate a particular embodiment of the dual-energy X-ray detector 100 proposed herein, each including a first detector line 110 having first detector elements 111 and a second detector line 120 having second detector elements 122 arranged in parallel therewith. In all embodiments, the two detector lines 110 and 120 are configured to respond differently spectrally selectively to a spectrum of the X-rays RX to be detected. For this purpose, associated first detector elements 111 in the form of Lo-detector elements for primarily detecting low-energy X-rays are arranged side by side in the first detector line 110, and associated second detector elements 122 in the form of Hi-detector elements for primarily detecting high-energy X-rays are arranged side by side in the second detector line 120. In principle, according to the improvement proposed herein, the two detector lines 110 and 120 are arranged parallel to each other in the line direction and are arranged one behind the other in the direction of the X-rays RX to be detected in such a way that the detector lines 110 and 120 are offset from each other in an overlapping manner.

In the embodiments shown, each Hi-detector element and each Lo-detector element have the same length L in the row direction, i.e., longitudinal direction of the detector 100, and the same width W orthogonal thereto. In the embodiments shown, the lengths $L_{Hi}$ and $L_{Lo}$ as well as the widths $W_{Hi}$ and $W_{Lo}$ are equal, i.e. the effective areas of the Hi-detector elements 111 and Lo-detector elements 122 are equal.

Figure 2A:
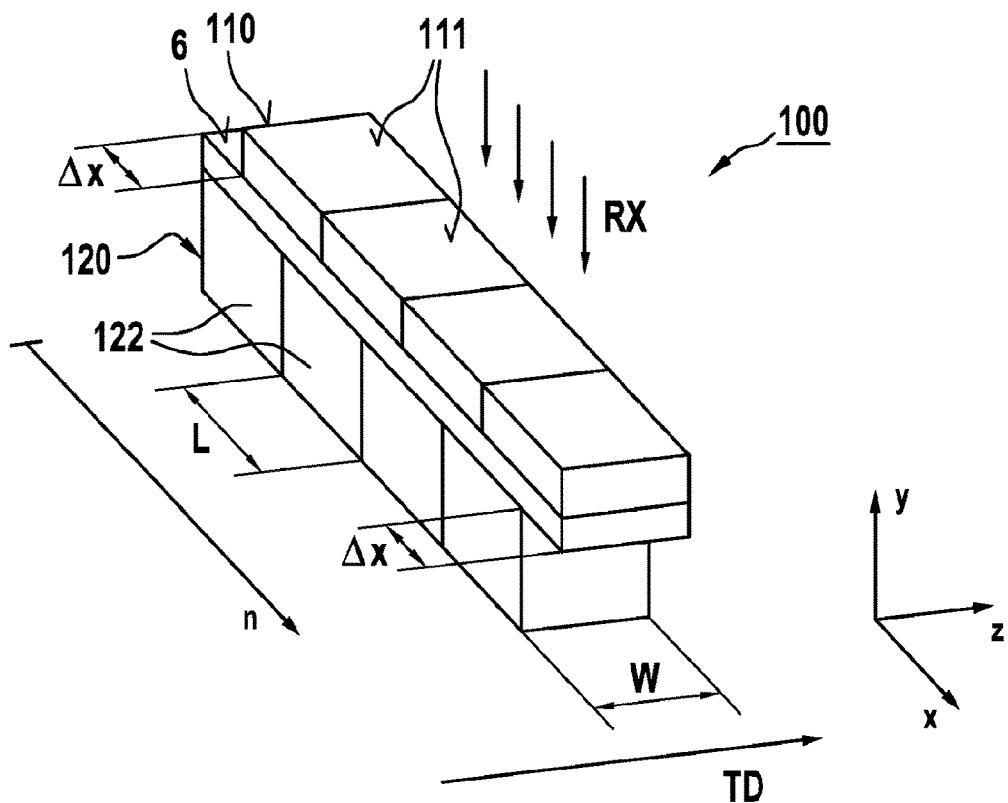
FIG. 2a is a simplified perspective view of the structure of a first embodiment according to the first implementation of the dual-energy X-ray detector proposed herein.
Figure 2B:
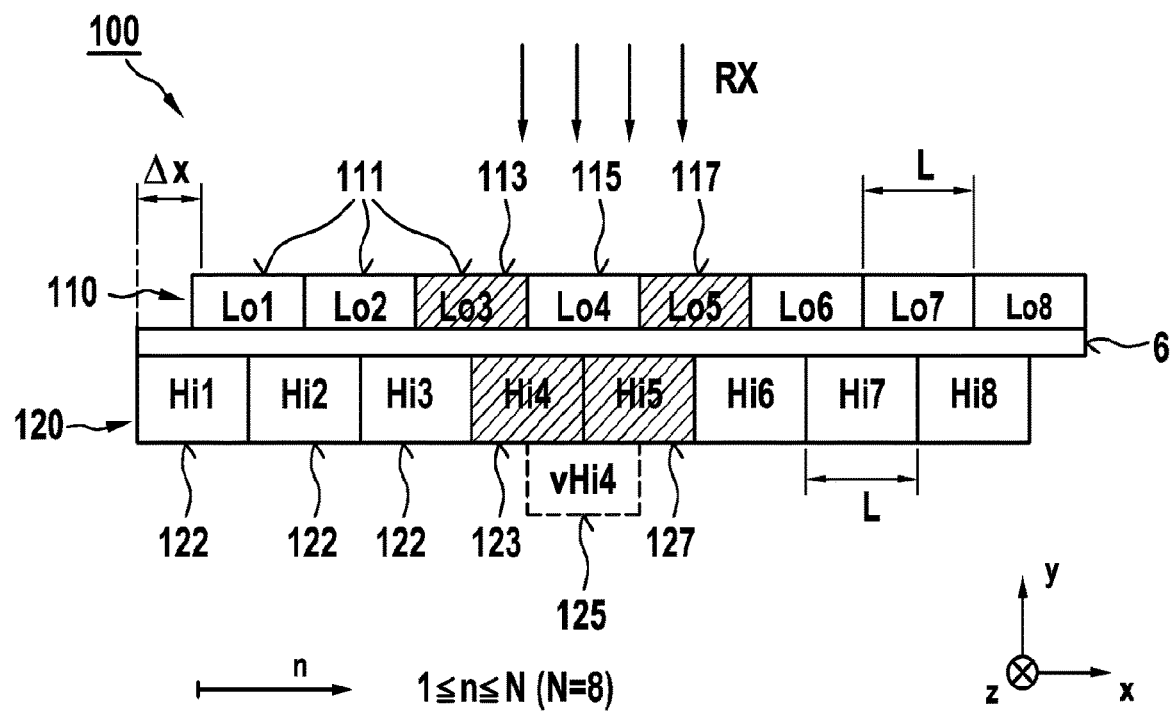

FIG. 2a shows a simplified perspective view of a first embodiment based on the first implementation of the dual-energy X-ray detector 100 proposed herein to illustrate the basic construction. FIG. 2b is a cross-sectional view through the xy plane of a detector 100 as shown in part in FIG. 2a.

In the FIGS. 2a and 2b, the first detector line 110 and the second detector line 120 are offset from each other by a first offset Δx in the line direction. In the embodiment shown, the offset Δx corresponds to exactly half the length L, i.e., Δx=L/2.

FIG. 2b illustrates (similar to FIG. 1b) the real Hi-detector data $Hi_1$, $Hi_2$, $Hi_3$, . . . , $Hi_N$ and Lo-detector data $Lo_1$, $Lo_2$, $Lo_3$, . . . $Lo_N$ provided by means of the individual detector elements 111 and 122. For a detailed description of the processing procedures for the real Hi-detector data explained in the description below and the associated readout procedures, the real readout Hi- and/or Lo-detector data are indexed along the detector line as shown in the FIG. 1b. Hi or Lo classifies a respective Hi-detector datum or Lo-detector datum indexed with the location variable n=1, 2, . . . , N for the respective position of the associated detector element in the detector line 2, where 1≤n≤N and N is the number of detector elements of the associated type (Hi or Lo) in the line direction. In the highly simplified representation of FIG. 2b, N=8, i.e., the detector line includes 8 Hi-detector elements and Lo-detector elements arranged along the detector line.

In the first detector line 110, a Lo-detector element 115 is shown providing a Lo-detector datum $Lo_4$. However, unlike the detector lines 1 of FIGS. 1a and 1b, there is no associated Hi-detector element for the Lo-detector element 115. To solve this, it is proposed here to calculate the Hi-detector datum missing from the Lo-detector datum $Lo_4$ from the existing Hi- and/or Lo-detector data in the form of a virtual detector datum $vHi_4$.

As explained above, the inventor has found that various approaches are possible for calculating the virtual Hi-detector data $vHi_\#$ and Lo-detector data $vLo_\#$, which can be used alone or in combination.

For example, in a particularly simple approach, a virtual Lo-detector datum $vLo_\#$ or Hi-detector datum $vHi_\#$ can be calculated based on the mean or median of adjacent Hi- and/or Lo-detector data. For example, the Hi-detector datum missing from the real detector datum $Lo_4$ acquired and provided by the Lo-detector element 113 may be calculated as a virtual Hi-detector datum $vHi_4$ as follows:

Based on two as a certain first number of immediately adjacent real Hi-detector data $Hi_4$ and $Hi_5$, i.e., the detector data of the two Hi-detector elements 123 and 127 overlapping with the Lo-detector element 115 under consideration, i.e., adjacent in line to the left and right thereof, and the three as a certain second number of nearest real Lo-detector data $Lo_3$, $Lo_4$, and $Lo_5$, i.e., the detector data of the Lo-detector element 115 under consideration and of the two Lo-detector elements 113 and 117 adjacent thereto on the left and right, the virtual Hi-detector datum $vHi_4$ can be calculated.

Thus, the behavior of the values of the Lo-detector data, by means of the values $Lo_3$, $Lo_4$ and $Lo_5$, can be considered when calculating the virtual Hi-detector datum $vHi_4$. The values $Hi_3$ and $Hi_4$ can be averaged and used as a base value for the virtual Hi-detector datum $vHi_4$. This approach can also be used as a basis for a machine learning algorithm, e.g., deep learning algorithm.

As a result, with the dual-energy X-ray detector 100 of the embodiment example of FIGS. 2a and 2b, a doubled spatial resolution can be achieved in the X-ray images derived from the detector data in the line direction of the detector 100.

Figure 2C:
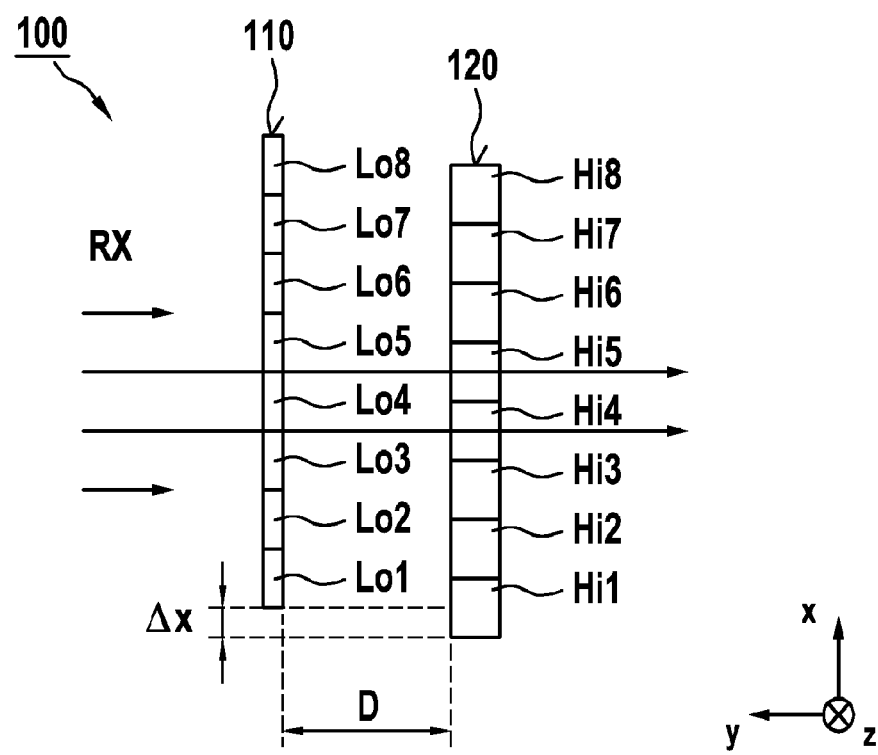
FIG. 2c is a side view of a detector according to the first implementation with spaced apart first and second detector lines.

FIG. 2c is a lateral view of a detector 100 according to the first implementation, wherein the first detector line 110 with the Lo-detector elements 111 and second detector line 120 with the Hi-detector elements 122 are arranged at a distance D (e.g., D=1 cm) from each other. The detector lines 110 and 120 are offset from each other overlapping in the line direction by the effective offset Δx. The X-rays RX incident on the detector 100 and passing through the detector elements run substantially orthogonal to the first and second detector lines 110, 120.

Figure 3:
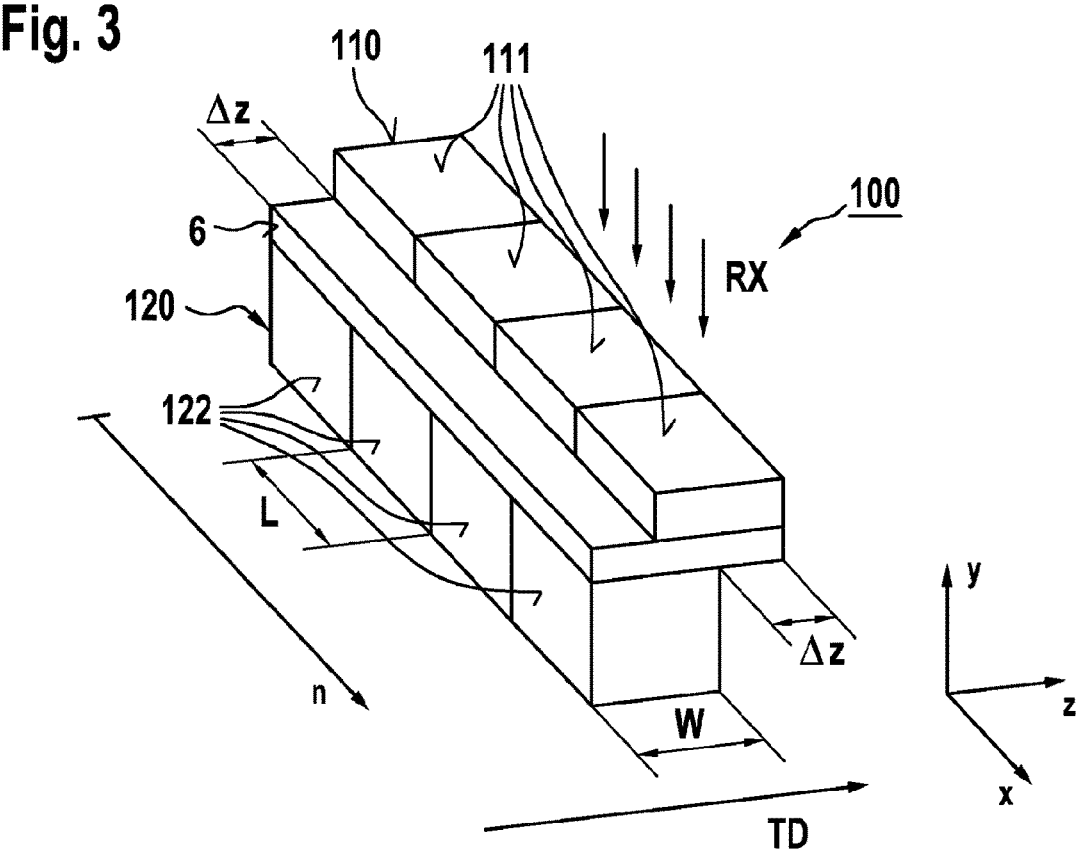
FIG. 3 is a simplified perspective view of the structure of a second embodiment based on the second implementation of the dual-energy X-ray detector proposed herein.

In FIG. 3, an embodiment according to the second implementation of the dual-energy X-ray detector 100 proposed herein is shown. The first detector line 110 and the second detector line 120 are now offset from each other by a second offset Δy orthogonal to the line direction. In the embodiment example shown, the offset Δy corresponds to exactly half the width W, i.e., Δy=W/2.

To calculate the missing detector data, the provided detector data can be processed, similar to what is explained in the FIGS. 2a and 2b, by calculating an associated virtual detector datum $vLo_\#$ or $vHi_\#$ for each real detector datum $Hi_\#$ or $Lo_\#$.

As a result, the dual-energy X-ray detector 100 of the embodiment of FIG. 3 can be used to increase the spatial resolution of the X-ray images derived from the detector data in the scanning direction and/or to increase the belt speed, considering the ratio of scanning speed or belt speed.

Figure 4:
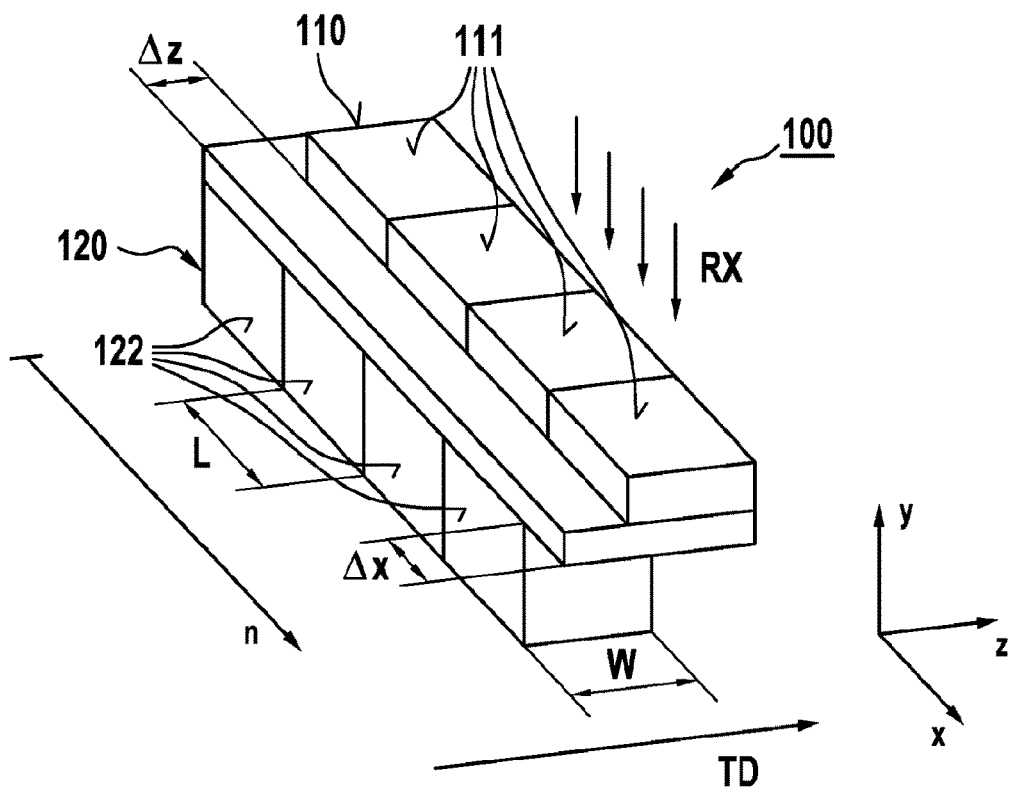
FIG. 4 is a simplified perspective view of the structure of a third embodiment based on a combination of the first and second implementations of the dual-energy X-ray detector proposed herein.

FIG. 4 shows an embodiment with a combination of the first implementation (FIGS. 2a and 2b) and second implementation (FIG. 3) of the dual-energy X-ray detector 100 proposed herein. That is, the first detector line 110 and the second detector line 120 are offset from each other in the line direction by the first offset Δx, where the offset Δx corresponds to half the length L, i.e., Δx=L/2. The first detector line 110 and the second detector line 120 are also offset from each other orthogonally to the line direction by the second offset Δy, where the offset Δy in the embodiment shown corresponds to exactly half the width W, i.e., Δy=W/2. As noted elsewhere, L=W may be. Thus, with the embodiment of FIG. 4, both the effects of the first and second implementations shown by way of example in FIGS. 2a-3b can be achieved simultaneously.

Figure 5:
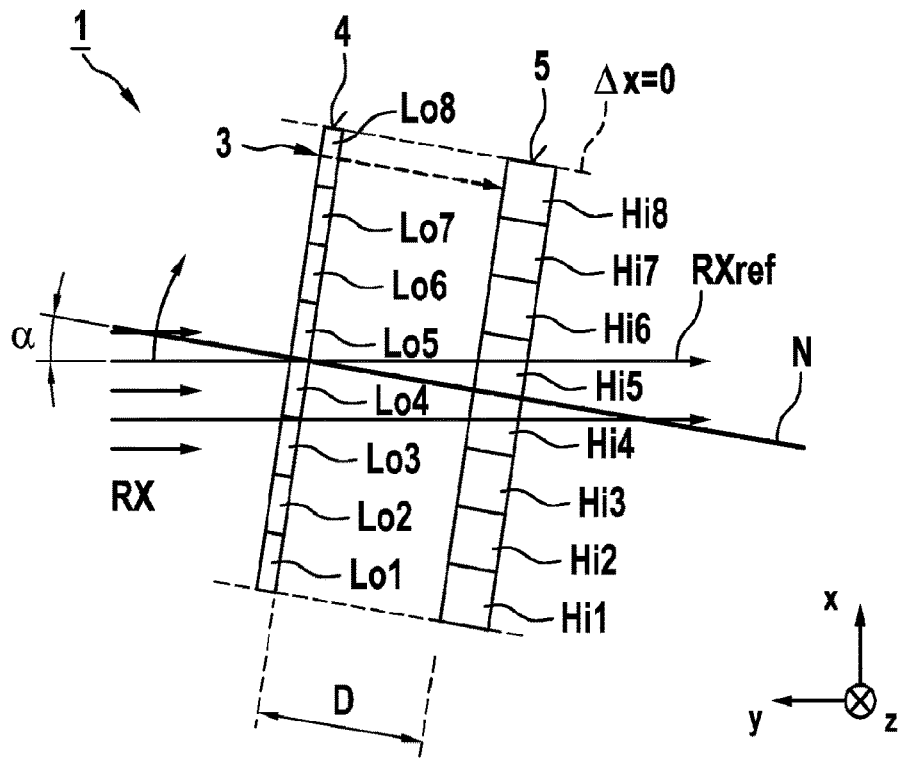
FIG. 5 is a side view of an inclined detector according to an embodiment of the third implementation, in which an effective offset is achieved as in the embodiment according to the first implementation that is illustrated in FIG. 2*c*.

FIG. 5 is a side view of the conventional detector 1 of FIG. 1, as an example of the use of a conventional detector by means of an arrangement according to the third implementation of the present disclosure for obtaining an effective offset. In strict comparison with FIG. 1, the Lo-detector elements 4 and the Hi-detector elements 5 of the detector line 2 of the detector 1 are spaced apart from each other by a distance D (e.g., D=1 cm) as a difference; this allows good comparability with FIG. 2c.

In the detector 1 of FIG. 5 there is no local offset between the Lo- and Hi-detector elements 4, 5 which are arranged 1:1 to each other. However, a desired effective offset between the Lo-detector elements 4 and the Hi-detector elements 5—for example like that in the detector 100 of FIG. 2c—can be achieved by means of the third implementation of the present disclosure by inclining the detector line 2 by an angle with respect to the incident X-rays RX. FIG. 5 shows in a very simplified way that only by means of this inclined arrangement of a conventional detector line 2 with respect to the X-rays RX incident thereon, the desired effective offset can be achieved, as it is achieved for example in the embodiment of the first implementation of FIG. 2c.

For better understanding, a normal N passing through the centers of the two lines formed by the associated Hi-detector and Lo-detector elements is plotted in the FIG. 5. Likewise, a reference X-ray beam RXref of the X-ray beams RX incident on the detector 1 is plotted, which is incident on the point of the detector 1 through which the normal N passes. The inclination angle is thus formed between the normal N and the reference X-ray beam RXref.

In the FIG. 5, the tilt angle is adjusted to give the desired effective offset Δx between the Lo- and Hi-detector elements 4, 5. Thus, in the example of FIG. 5, effectively the same offset is achieved as in the corresponding embodiment of the first implementation in FIG. 2c.

The principle of the third implementation, which is thus illustrated in the FIG. 5, can correspondingly also be transferred to the second implementation. Likewise, the third implementation can be combined with the first and/or second implementation. Finally, by means of a corresponding inclination of the detector, the effect of the combined first and second implementation can also be achieved by means of the third implementation alone.

FIG. 6 shows a system 400 including an X-ray inspection apparatus 200 and a processing apparatus 300.

The X-ray inspection apparatus 200, shown in highly simplified form, has radiation shielding curtains 202, 204, one of which is arranged at each of an input 206 and an output 208 of a radiation tunnel 210 of the X-ray inspection apparatus 200. Between the radiation shielding curtains 202, 204, within the radiation tunnel 210 is a radiation area 212 having at least one radiation source 214, such as an X-ray tube, with a collimator for generating an X-ray fan 215 that is aligned with the dual-energy X-ray detector 100 proposed herein. A transport device 218, for example a sliding belt conveyor, is used to transport a baggage item 216 as an inspection object in the transport direction TD through the radiation tunnel 210. The line-shaped detector 100 is L-shaped or U-shaped and arranged with its longitudinal direction orthogonal to the transport direction TD, so that the transport direction TD corresponds to the scanning direction of the inspection object 216.

The processing apparatus 300 is substantially configured for performing at least one of the methods proposed herein for processing the Hi- and/or Lo-detector data acquired by the dual-energy X-ray detector proposed herein. For example, the dual-energy X-ray detector 100 is one as shown in simplified form in the FIGS. 2a-5. The detector data provided by the dual-energy X-ray detector 100 and processed by the processing apparatus 300 may be used to produce an X-ray image of the inspection object 216, colored based on material classes, which is displayed to an operator on a screen (not shown) in a manner known per se.

The processing apparatus 300 may be part of a control device 220 of the X-ray inspection apparatus 100, as shown in the FIG. 6. The processing apparatus 300 can in principle also be located completely separately from the X-ray inspection apparatus 200, for example at a central location where the raw detector data of several inspection apparatuses 200 converge and are centrally processed there. This makes no difference to the proposed measures for processing the detector data.

The processing unit 300 may also be part of the detector 100, so that the detector data generated by the detector 100 is already processed at the detector 100 according to the measures proposed herein. Thus, the detector 100 proposed herein can in principle be made compatible with existing X-ray inspection apparatuses having conventional detector units. I.e., as a result, an implementation of the new detector 100 proposed here with integrated processing of the detector data could be used with lower system costs with a constant image quality in an X-ray inspection apparatus which is otherwise sufficiently identical in construction. Alternatively, the spatial resolution of an existing X-ray inspection apparatus could be increased at nearly the same system cost.

Referring now to FIGS. 2b and 7-10, one approach for processing Hi- and/or Lo-detector data provided by a dual-energy X-ray detector 100 proposed herein is presented. In principle, a wide variety of approaches are conceivable for computing virtual detector data for the missing detector elements due to the offset. The essential insight of the improvement proposed herein lies in the overlapping offset Hi-detector and Lo-detector elements of the dual-energy X-ray detector 100, as illustrated for example in the FIGS. 2a-5.

With reference to FIG. 2b, the task underlying the processing of the provided real Hi- and/or Lo-detector data is initially clarified.

The detector setup illustrated in the FIG. 2a with overlapping Hi- and Lo-detector lines 110 and 120 leads to the problem that not every real Lo-detector datum, for example the Lo-detector datum $Lo_4$, can be assigned exactly to a Hi-detector datum—and vice versa. Therefore, the respective detector datum of the other type associated to a certain real Hi-detector datum (Hi or Lo) must be supplemented as a virtual detector datum suitably determined by calculation or in another way. In FIG. 2b the virtual detector date $vHi_4$ is drawn as an example for the real detector date $Lo_4$.

A "real detector datum" is understood here as an intensity value for measured X-rays actually detected with a specific detector element physically present at the detector 100.

A "virtual detector datum" is understood herein to mean a virtual intensity value generated for at a particular location of a detector element physically absent from the detector 100, by calculation or otherwise.

If the value of a particular Lo-detector element 111, for example the detector datum $Lo_4$, takes the value x, the associated Hi-detector datum can take values from x to x+a depending on the material being transmitted. For plastic, the difference a would be very small, i.e., the sought Hi-detector datum $vHi_4$ and the Lo detector datum $Lo_4$ would be approximately identical. For steel, the difference captured in a would be substantial. It is precisely this circumstance—as explained above—that is used for material detection by dual-energy radiography. That is, in order to distinguish steel from plastic or aluminum at a location, the information from the Hi-channel and the Lo-channel of the dual-energy X-ray detector 100 is needed for that location. If the value of the associated Lo detector datum could be inferred directly from a Hi-detector datum, two differently spectrally selective measurements would not be required.

The inventor has found that in the place of a real Lo- or Hi-detector datum, the associated missing value can be determined as a virtual vLo- or vHi-detector datum with a sufficient degree of accuracy. In this context, it is desirable for practicality to achieve a result as close to reality as possible with as little computing power as possible.

A simple approach would be, for example, to calculate the missing real Hi-detector datum to the real Lo-detector datum $Lo_4$ as the average of the two neighboring real Hi-detector datums $Hi_4$ and $Hi_5$. However, this simple approach does not achieve the required accuracy.

The inventor has further found that the behavior of Hi-detector data in the Hi-channel and the behavior of Lo-detector data in the Lo-channel of the detector 100 are similar. In other words, when the signal in the Hi-channel decreases, it also decreases in the Lo-channel under real conditions and vice versa. Depending on the material being radiated through, more or less strongly. That is, the behavior of the detector data in the Lo-channel, i.e., the Lo-detector line 110 can be used in determining the virtual Hi-detector value $vHi_4$. For example, as mentioned elsewhere, a deep-learning algorithm could be used that is trained to compute the missing virtual Hi- and/or Lo-detector data.

Before detailing here one approach that has been shown to be surprisingly implementable and to require low computational power to provide practical results, it is shown with reference to FIGS. 7-10 how, by means of the various possible configurations of the dual-energy X-ray detector 100 proposed herein (as shown in FIGS. 2a-5), the desired improvement in spatial resolution can be achieved in the generated X-ray images.

In the FIGS. 7-10, in each case in the left part of the Figure, the time sequence of a readout process is shown on a highly simplified dual-energy X-ray detector 100 (detector 100 for short), as shown, for example, in the FIG. 2a, and whose Hi- and Lo-detector lines each have only 4 associated real detector elements. The real Hi-detector elements are shown as empty/white circles and the real Lo-detector elements as filled/black circles.

With reference to the X-ray inspection apparatus 200 shown as an example in the FIGS. 6, the provision of the real Hi- and/or Lo-detector data is briefly described. The readout of the detector 100 is done sequentially. The real detector data output by each Hi- and/or Lo-detector element is indexed by type Hi or Lo, the first digit after Hi or Lo is the location variable n in the detector line, and the second digit is the sequential numbering of the detector readouts that have occurred. For example, $Lo_{32}$ is a Lo detector date of the 3rd (n=3) Lo-detector element in the 2nd (t=2) readout.

As shown, for example, in FIG. 6, the conveyor belt 218 moves continuously and thereby continuously transports the inspection object 216 in the transport direction TD through the X-ray fan 215. Due to the continuous movement of the inspection object 216 relative to the detector 100 as well as the temporally sequential readout of the individual detector elements, the respective readout situation illustrated on the left in the FIGS. 7-10 results for the real Hi- and/or Lo-detector data.

Figure 9:
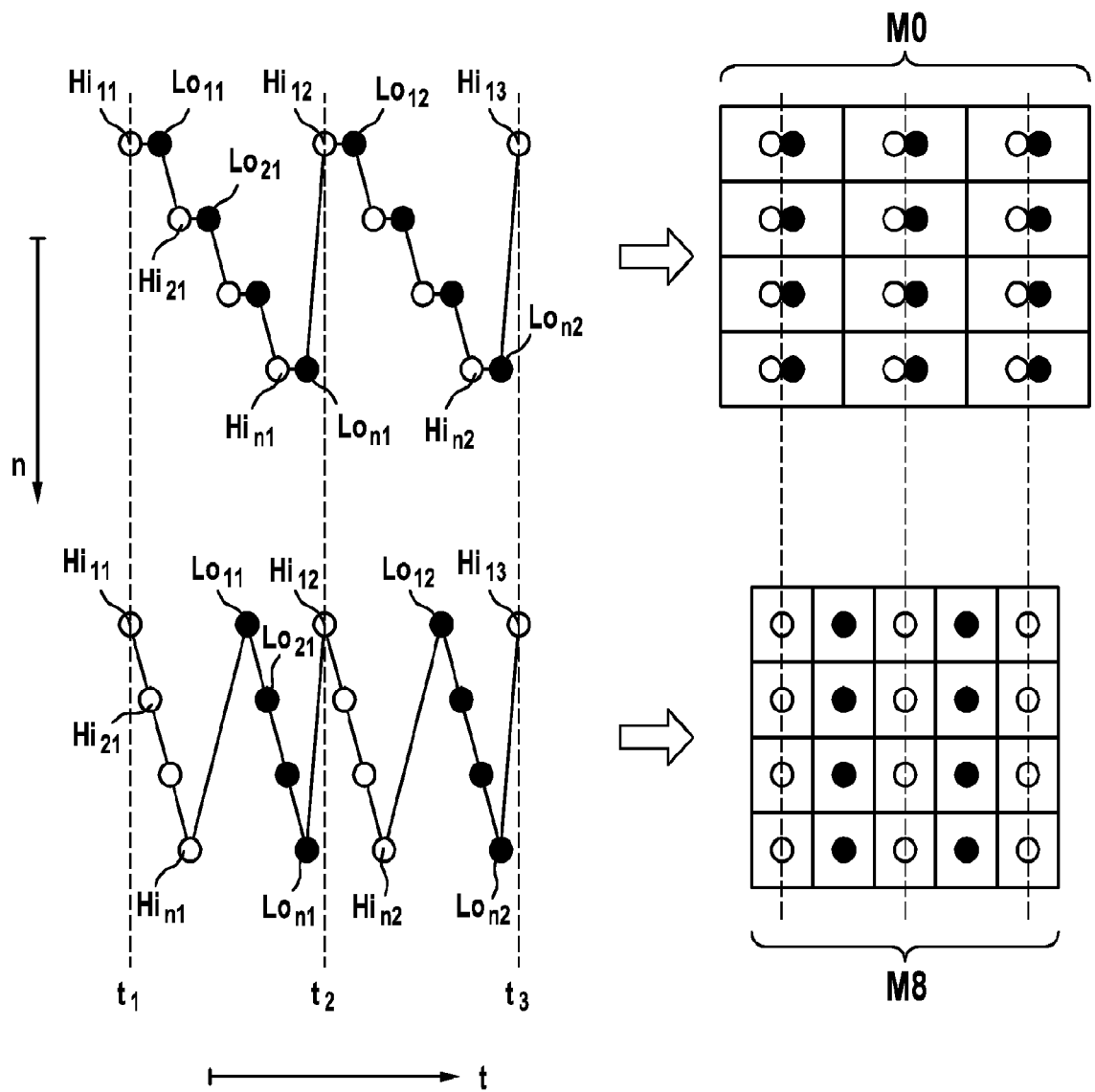
FIG. 9 illustrates the readout situations of the detector data with a detector of FIGS. 1*a* and 1*b* as reference (FIG. 9 top) and how a readout situation similar to that shown in FIG. 8 can be achieved with a detector of FIG. 1 by means of a modified readout sequence of the Hi- and/or Lo-detector elements (FIG. 9 bottom).
Figure 10:
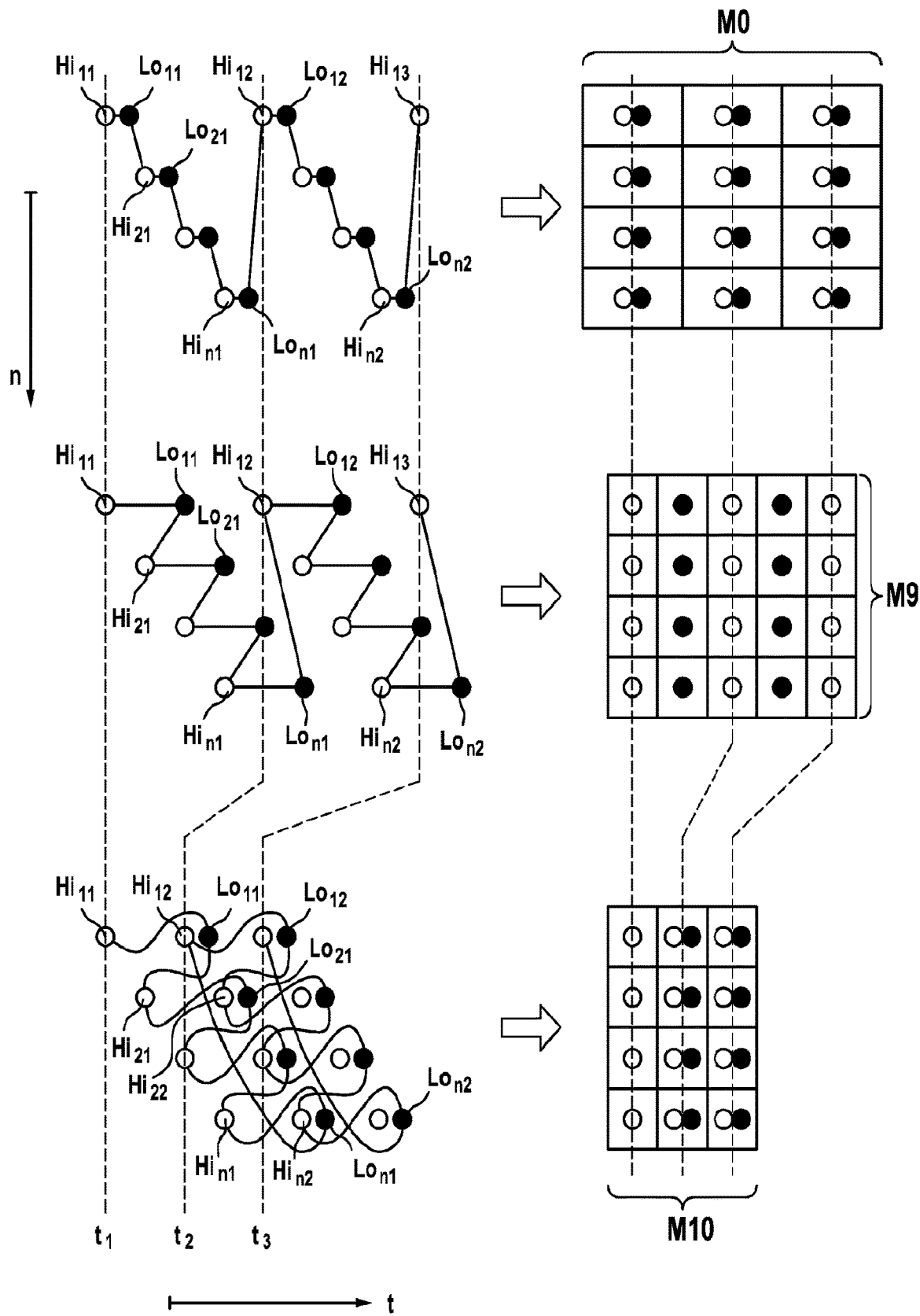
FIG. 10 illustrates the readout situations of the detector data with a detector of FIGS. 1*a* and 1*b* as reference (FIG. 10 top) and of FIG. 3 as second reference (FIG. 10 middle) and additionally of FIG. 3 (FIG. 10 bottom) with an offset of the pixels in z-direction corresponding to twice the offset of that of FIG. 8.

In the upper half of FIGS. 7-9 and the upper third of FIG. 10, respectively, the readout situation for the conventional detector 1 shown in the FIGS. 1a and 1b is illustrated. Here, the Hi-detector datum $Hi_{11}$ of the first Hi-detector element is read out, temporally thereafter the Lo-detector datum $Lo_{11}$ of the first Lo-detector element; then the Hi-detector datum $Hi_{21}$ of the second Hi-detector element is read out, temporally thereafter the Lo-detector datum $Lo_{21}$ of the second Lo-detector element; and so on. Once the Lo-detector datum $Lo_{n1}$ of the last Lo-detector element has been read out, the process starts again at the first Hi-detector element and reads out the Hi-detector datum $Hi_{12}$ there.

The right part of the FIGS. 7-10 shows in each case a two-dimensional matrix M #, whose fields are assigned in each case the acquired real Hi- and/or Lo-detector data. Each field of the matrix M # with the associated detector data corresponds to a respective pixel of an X-ray image to be derived from the detector data. Therefore, one can immediately see from the matrix M # of the respective FIGS. 6-9 the achieved effect of the respective proposed modification of the associated detector 100 on the spatial resolution of the X-ray image derived from the respective detector data. The upper right half of each image with the matrix M0 provided by means of the conventional detector 1 of FIGS. 1a and 1b serves as reference for the matrices M6-M10 of FIGS. 7-10.

The continuous movement of the inspection object during scanning as well as the sequential readout of the real detector elements effectively leads to a temporal offset between two adjacent readout processes as well as to a spatial offset in the pixels of an X-ray image assigned to the individual detector data. In the matrices M0 and M6-M10 of the right parts of FIGS. 7-10, this effective offset is no longer shown, but would still be visible in an associated X-ray image if it were not compensated for again by shifting the individual image lines relative to each other accordingly by default.

Now, with reference to the upper section of FIG. 7, the readout situation is illustrated for a detector 100 according to the first implementation of FIGS. 2a and 2b. On the detector 100, the Hi-detector line is offset from the Lo-detector line in the line direction and thus perpendicular to the transport direction TD (FIG. 6) by an offset Δx corresponding to half a length L of a detector element. The real Hi- and/or Lo-detector data are read out in the same order as for detector 1 (upper half of FIG. 7). The readout situation of FIG. 7 shows that now not every real Hi-detector datum can be assigned to a Lo-detector datum and vice versa.

With reference to the matrix M6 of FIG. 7, it can be seen in comparison to the matrix M0 of the same Figure that the resolution in the direction of the detector line, i.e., perpendicular to the tape running direction or scanning direction is improved, namely doubled.

The configuration of the detector line 100 and the readout situation of FIG. 7 is of interest in practice if the spatial resolution of the X-ray images derived from the detector data is to be increased in the line direction of the detector 100 (i.e., orthogonal to the transport direction or scanning direction). Resolution in this dimension of the X-ray images cannot be achieved simply by increasing the readout frequency. The only alternative would be to use more and smaller detector elements, which would increase the cost per detector and increase the noise in the detector data, thus worsening the signal-to-noise ratio.

FIG. 8 shows the readout situation for a detector 100 according to the second implementation of FIG. 3, i.e., on the detector 100 the Hi-detector line 120 and the Lo-detector line 110 have been offset orthogonal to the line direction, i.e., in the transport direction TD (cf. FIG. 5), overlapping each other by an offset Δy corresponding to half a width W of the detector elements. If the real Hi-detector and Lo-detector elements are read out sequentially in the same order as in FIG. 7, the read-out situation illustrated in the FIG. 8 is obtained.

With reference to the matrix M7 of FIG. 8, it can be seen in comparison to the matrix M0 of the same figure that, similarly to the readout situation of FIG. 7, also in the readout situation of FIG. 7, no longer exactly one Lo-detector datum can be unambiguously assigned to each Hi-detector datum. However, the matrix M7 of FIG. 8 shows that the spatial resolution in an X-ray image which can be derived from the detector data is improved in the scanning direction (or in the transport direction TD, FIG. 6), namely doubled.

The readout situation of FIG. 8 is interesting if either the spatial resolution of the derived X-ray image in the scanning direction or in the transport direction (TD, FIG. 6), respectively, or the transport speed for the inspection objects through the X-ray inspection apparatus is to be increased while the resolution remains the same, with appropriate adjustment of the ratio of readout frequency and belt speed.

For the overlapping offset Δy between the Hi-detector line 120 and the Lo-detector line 110 in the scanning direction (orthogonal to the line direction of the detector 100), it has proven particularly suitable to define the offset Δz as (m b)/(2 f), where b is the belt speed in cm/s and f is the readout frequency in 1/s and m is an odd integer (m=1, 3, 5, 7, . . . ). Alternatively or complementarily, the spatial resolution can be increased in the scan direction or orthogonal to the line direction of the detector by increasing the readout frequency f.

Now, with reference to FIG. 9, another clever consideration of the inventor is illustrated. The inventor has recognized that a similar effect on the spatial resolution achieved (or alternatively the transport speed or scanning speed to be set), as is achieved quasi-hardware-wise with the second implementation of the detector 100, can also be achieved in an X-ray inspection apparatus with a conventional detector 1, as shown in the FIGS. 1a and 1b, by means of a modified readout pattern (d. i.e., readout sequence) for the Hi- and/or Lo-detector data on the conventional dual-energy X-ray detector 1 of FIGS. 1a and 1b.

The readout situation illustrated in the FIG. 9 arises when using a dual-energy X-ray detector line with, per pixel, one high-energy Hi-detector element and one low-energy Lo-detector element, respectively, which are arranged substantially congruently one above the other or one behind the other in the direction of the X-rays to be detected.

As shown in the left part of FIG. 9, the readout sequence at the detector 100 is modified such that initially all detector elements of one type (Hi or Lo) are read out along the location variable n of the detector line and subsequently all detector elements of the other type are read out along the location variable n of the detector line. I.e., for example, as shown in the FIGS. 9, initially all Hi-detector data $Hi_1$, $Hi_2$, $Hi_3$, . . . $Hi_N$, and then all Lo-detector data $Lo_1$, $Lo_2$, $Lo_3$, . . . $Lo_N$ are read out (or vice versa).

Comparison of matrices M7 and M8 shows that the same result can be achieved with the modified readout sequence of FIG. 9 as is achieved by shifting the first detector line 110 and the second detector line 120 with respect to each other in the detector 100 according to the second implementation. Thus, the readout method of FIG. 9 is an equivalent software solution to the hardware solution of FIGS. 3 and 8, with Hi-detector and Lo-detector elements overlapping each other. In other words, if the Hi-detector and Lo-detector lines 110, 120 on the detector are not offset from each other in the scanning direction, but the readout sequence of the Hi- and Lo-detector elements is suitably changed, the same effect on the spatial resolution is achieved as with the detector line 100 of FIGS. 3 and 8. As a result, the spatial resolution in the transport direction and scanning direction is also improved in this case.

The readout situation of FIG. 9 is elegant, since essentially no modifications to a conventional detector 1 (cf. FIGS. 1a and 1b) are required. To implement the modified temporal readout sequence, a redesign of the circuit board of the detector 1 or a redesign of the readout chip might be required. If a readout chip interconnected with the detector 1 is capable of internally changing the timing sequence of the readouts of the individual real Hi-detector and Lo-detector elements as desired, the implementation of the readout situation of FIG. 9 is possible without major measures.

Another effect of the second implementation will now be illustrated with reference to FIG. 10. For a certain pair of values (b1, f1) an offset $\Delta z=(m\,b)/(2\,f)$ can be calculated, which leads to a situation as shown in the middle of FIG. 10, where missing values have to be calculated.

Since X-ray machines are often integrated in a complex system of conveyors, it may sometimes be desirable to adapt the belt speed to these conditions.

The inventor has recognized that it is not necessary to develop different types of equipment to implement multiple conveyor speeds, since the second implementation of the present disclosure provides a high degree of flexibility. Now, with reference to FIG. 9, another clever consideration of the inventor is illustrated which can be used as explained below.

To the same offset $\Delta z$ belong other pairs of values $(b_2, f_2)$ at which a situation arises as shown below in FIG. 10. In this case, either $b_2=b_1/2$ or $f_2=2\,f_1$, which corresponds to half the belt speed or twice the readout frequency. Here, the advance of the baggage item in the conveying direction corresponds exactly to the offset $\Delta z$ and for each measured Hi-detector datum there is again a real measured Lo-detector datum and vice versa. Thus, an X-ray system can be operated with an offset $\Delta z$ in two different modes.

Now, with reference to FIGS. 11-14, an embodiment of an approach for processing the acquired real Hi- and/or Lo-detector data with a dual-energy X-ray detector 100 proposed herein is explained.

For a compromise between a good algorithm and an efficient algorithm for processing the real Hi- and/or Lo-detector data, the inventor has found that an algorithm from the field of digital optical photography is suitable. Digital photography uses image sensors with an upstream Color Filter Array (CFA), so that each individual pixel of the image sensor can detect only one of the three primary colors (red, blue, or green). The most commonly used pattern of such a CFA is the Bayer pattern mentioned above.

The inventor has recognized that the structure of the matrices M6-M10 provided by the detectors 100 proposed herein (FIGS. 2a-6, and 7-8) or by the modified readout method (FIG. 9) can possibly be processed with respect to the Hi- and/or Lo-detector data contained therein in a manner similar to the processing of the image data acquired by an image sensor with Bayer CFA.

In the case of the image data generated by the image sensor with Bayer CFA, for each pixel, the respective two other color information must be supplemented by a suitable calculation. In the Hi- and/or Lo-detector data of FIGS. 7-9, a virtual detector datum of the other type must be calculated for each of the real detector datums of one type (Hi or Lo).

The inventor proposes to modify a CFA demosaicking used in digital image sensors for a processing of the real detector data of the detectors 100 proposed herein. Since there are numerous known implementations for CFA demosaicking, it should be sufficient here to explain the basic principle of adaptation. Indeed, the present disclosure is in no way limited to any particular single or particular implementation.

The core idea of CFA demosaicking is to calculate for each pixel of a Bayer pattern the missing two colors from the known actually detected colors in the near environment.

Correspondingly, this means for the matrix M6* that e.g., at the position of the real Hi-detector datum 44 the missing virtual Hi-detector datum 44 can be calculated from the actually acquired Hi- and/or Lo-detector data in the nearer environment.

Figure 11:
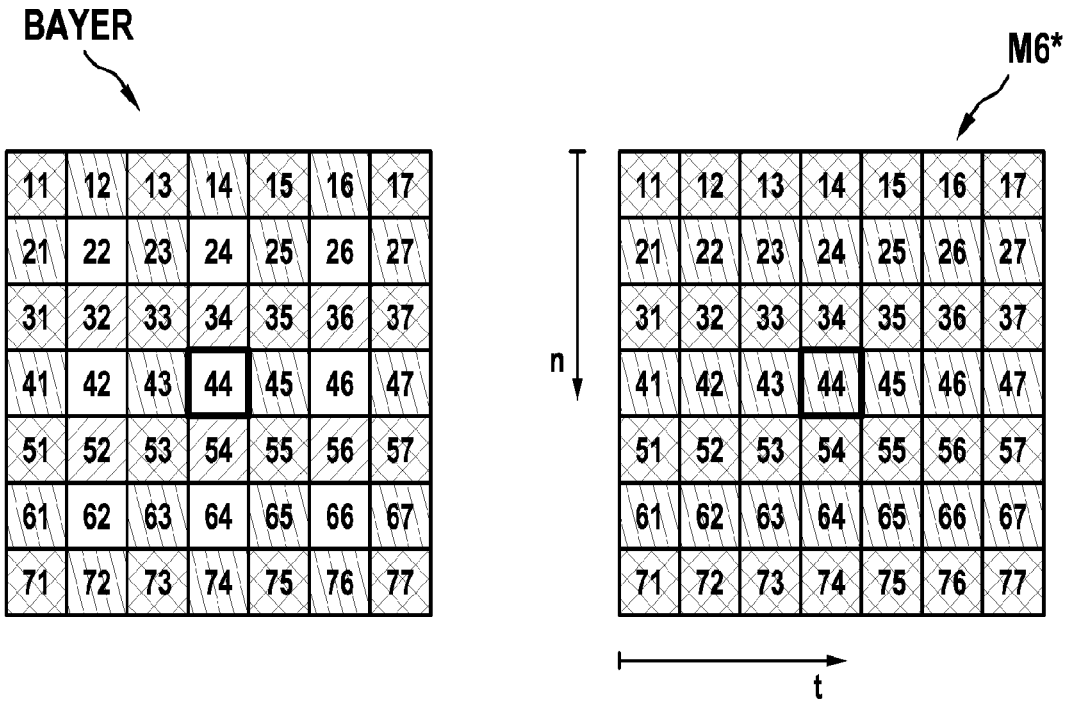
FIGS. 11-13 illustrate an embodiment of an approach for processing detector data acquired with a dual-energy X-ray detector proposed herein based on a demosaicking algorithm.

FIG. 11 initially shows a comparison of the Bayer pattern BAYER (FIG. 11, left) with the Hi- and/or Lo-detector data matrix M6* (FIG. 11, right), as it results, for example, in the readout situation of FIG. 7 with the detector of FIGS. 2a and 2b. In the Bayer pattern BAYER (FIG. 11, left), the white boxes represent blue pixels, the hatched boxes represent green pixels, and the cross-hatched boxes represent red pixels. In the matrix M6* (FIG. 11, right), the Lo-detector data are represented by hatched boxes and the Hi-detector data are represented by cross-hatched boxes.

Figure 12:
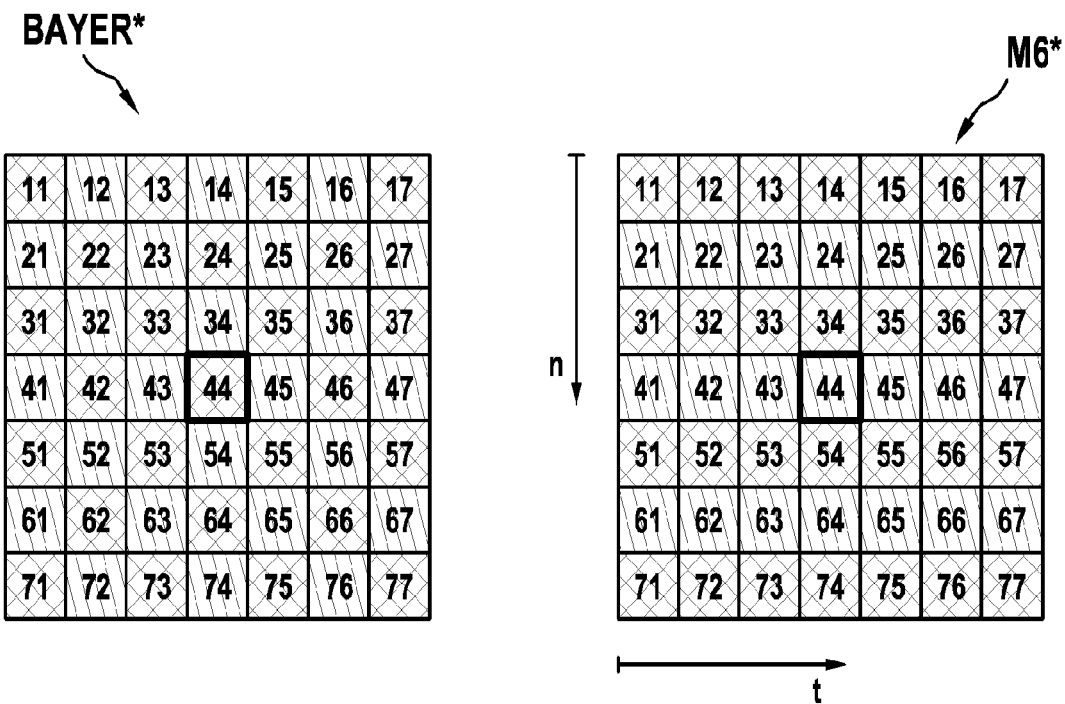

In the FIG. 12, the Bayer pattern BAYER of the FIG. 11 has been reduced to two colors. I.e., the modified Bayer pattern BAYER* is now a checkerboard with the remaining two colors red and green.

Figure 13:
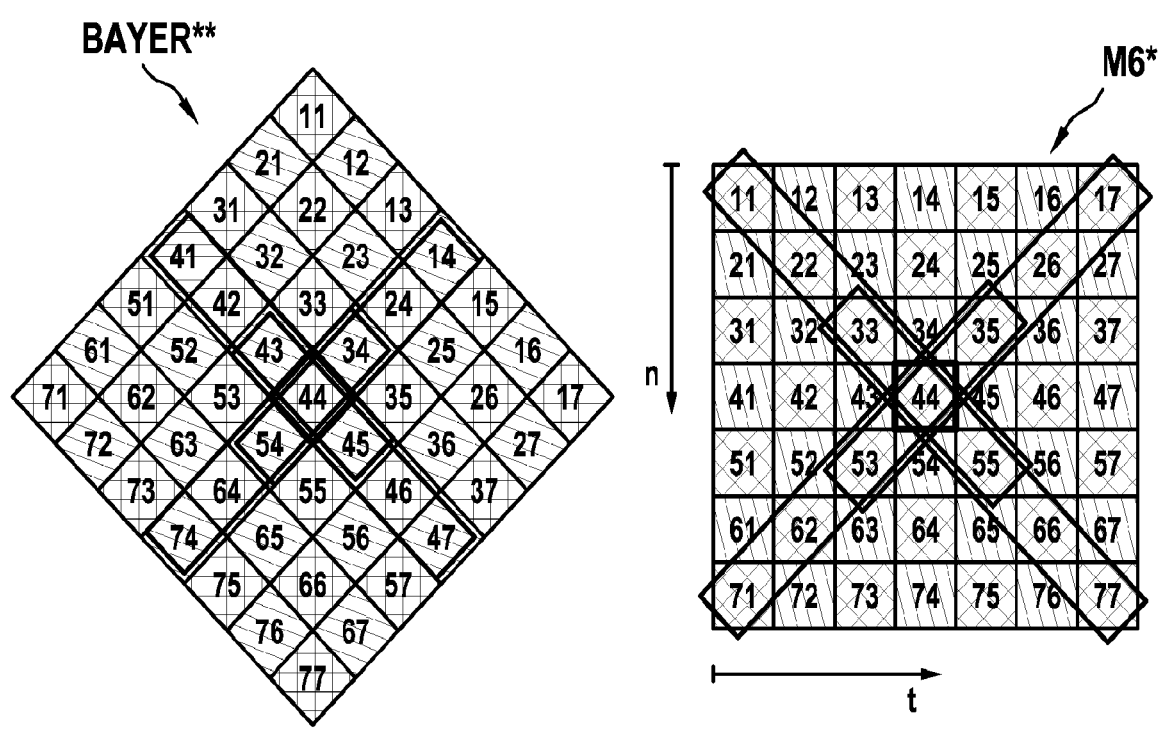

In FIG. 13, compared to FIG. 12, only the matrix BAYER* has been rotated 45° clockwise to illustrate a suitable assignment of the data of the matrix M6* to the data of the modified Bayer pattern BAYER. FIG. 13 further illustrates that the modified Bayer pattern BAYER and the matrix M6* have a similar alternating structure. For example, the pixels in the marked areas in the modified Bayer pattern BAYER** can be mapped to the detector data in the marked areas of the matrix M6*.

Based on the foregoing, the CFA demosaicking algorithm for the Bayer pattern can be applied to the detector data in matrix M6*.

The inventor has found that the results are somewhat poorer because the detector dimensions are farther apart in the horizontal and vertical directions than the pixels in the Bayer pattern. However, this can be compensated for by the fact that the vertical detector data series can still be considered in the M6* matrix, which does not exist in the BAYER** Bayer pattern.

The algorithm for calculating the missing values is based on the publication "Color filter array demosaicking using high-order interpolation techniques with a weighted median filter for sharp color edge preservation" by Li and Randhawa (IEEE Transactions on image processing, Vol. 18, No. 9, September 2009), the contents of which are hereby incorporated by reference.

In this work, an interpolated value for the missing pixel is initially determined for each of a given number of spatial directions, based on a Taylor series expansion of the measured data in the near vicinity. Then, for each of these spatial directions, a gradient is calculated, which is a measure of how much the signal changes in the respective direction. With the help of these gradients, in a last step the weighted average value is formed from all interpolated values.

Using the adapted demosaicking method, the matrices of detector data provided by the detectors 100 proposed here provide surprisingly good results with an unanticipated low computational cost.

Finally, the following FIGS. 14-17 illustrate various aspects of the methods proposed herein for processing real Hi- and/or Lo-detector data acquired from an inspection object using one of the detectors 100 described herein.

Figure 14:
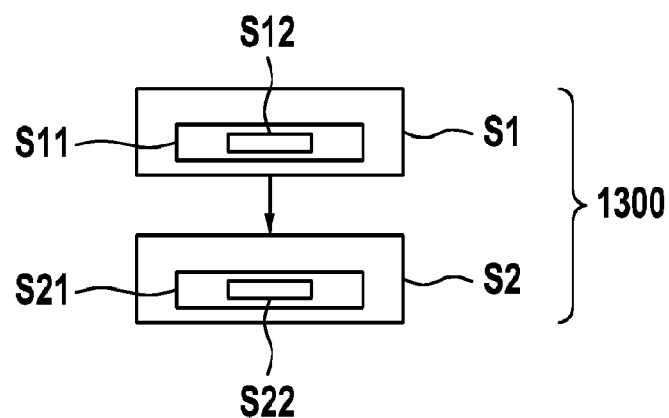
FIGS. 14-17 illustrate methods for processing and preparing real detector data acquired with the dual-energy X-ray detectors shown in the FIGS. 1*a*-5 to provide additional required virtual detector data.

FIG. 14 illustrates the basic structure of a method 1300 for processing Lo detector data $Lo_1, Lo_2, Lo_3, \ldots, Lo_N$ and Hi detector data $Hi_1, Hi_2, Hi_3, \ldots, Hi_N$ provided by, for example, the X-ray inspection apparatus 200 of FIG. 6. Thereby, the method includes the following basic steps: a step S1 for calculating a respective virtual Lo-detector datum vLo at the position of a real Hi-detector element 122 (cf. e.g., FIG. 2b); and a step S2 for calculating a respective virtual Hi-detector datum vHi at the position of a real Lo-detector element 111 (cf. e.g., FIG. 2b).

In the method 1300, the step S1 for calculating a virtual Hi-detector datum vLo at the position of a real Hi-detector element 122 includes: A step S11 for calculating the virtual Lo-detector datum based on a certain first number of real Lo-detector data adjacent to the real Hi-detector element 122 and a certain second number of real Lo-detector data adjacent to the real Hi-detector element 122.

In the method 1300, the step S2 for calculating a virtual Hi-detector datum vHi at the position of a real Lo-detector element 111 includes: A step S21 for calculating a virtual Hi-detector datum based on the determined first number of real Hi-detector data adjacent to the real Lo-detector element 111 and the determined second number of real Lo-detector data adjacent to the real Lo-detector element 111.

The step S11 has a step S12 for calculating the virtual Lo-detector data as a mean value from adjacent Hi- and/or Lo-detector data.

The step S21 includes a step S22 for calculating the virtual Hi-detector data as a mean value from adjacent Hi- and/or Lo-detector data.

Figure 15:
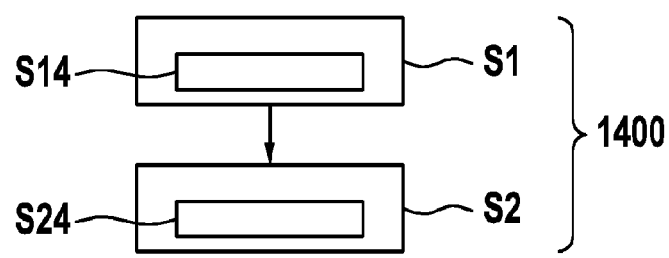

FIG. 15 illustrates a modified method 1400, wherein step S1 includes a step S14 for calculating the virtual Lo-detector data considering the behavior of the values of the Hi- and/or Lo-detector data, and step S2 includes a step S24 for calculating the virtual Hi-detector data considering the behavior of the values of the Lo-detector data.

In the methods 1300, 1400 illustrated in the FIGS. 14 and 15, the aforementioned calculation steps for the virtual Hi- and/or Lo-detector data can be implemented based on the provided Lo- and Hi-detector data using a deep learning algorithm (DLA)

Figure 16:
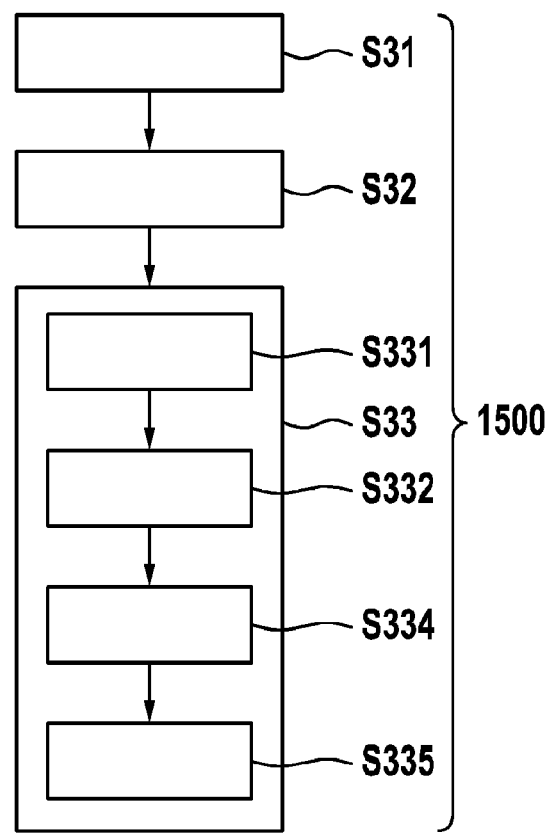

FIG. 16 illustrates a method 1500 as a particular implementation of the method 1300 of FIG. 14. As a prerequisite for the method 1500, for example in the inspection system 200 of FIG. 6, the detector data acquired and provided by the dual-energy X-ray detector 100 are indexed via a location variable n, which runs in the line direction of the dual-energy X-ray detector 100 starting at one end, in such a way that the Lo-detector elements contain real Lo-detector data $Lo_1$, $Lo_2$, ..., $Lo_n$, ..., $Lo_N$ of the inspection object and the Lo-detector elements detect corresponding real Hi-detector data $Hi_1$, $Hi_2$, ..., $Hi_n$, ..., $Hi_N$ of the inspection object, where $1 \leq n \leq N$ and N is respectively the number of Hi- and/or Lo-detector elements in the line direction of the dual-energy X-ray detector (100). The method 1500 of FIG. 15 has the following steps:

A step S31 of reading out the real Hi-detector and Lo-detector elements 111, 122 (cf. FIG. 2*b*) of the dual-energy X-ray detector 100 in pairs in the order $Hi_1$, $Lo_1$, $Hi_2$, $Lo_2$, ..., $Hi_n$, $Lo_n$, ..., $Hi_N$, $Lo_H$ (or vice versa in the order $Lo_1$, $Hi_1$, $Lo_2$, $Hi_2$, ..., $Lo_n$, $Hi_n$, ..., $Lo_N$, $Hi_N$).

A step S32 for forming, by means of several sequences $Hi_1$, $Lo_1$, $Hi_2$, $Lo_2$, ..., $Hi_n$, $Lo_n$, ..., $Hi_N$, $Lo_N$ (or $Lo_1$, $Hi_1$, $Lo_2$, $Hi_2$, ..., $Lo_n$, $Hi_n$, ..., $Lo_N$, $Hi_N$) read out in this way, a two-dimensional Hi/Lo-detector data matrix M5-M10; M6* (cf. FIGS. 7-10).

A step S33 for calculating the virtual Hi- and/or Lo-detector data using an adapted demosaicking algorithm. The adaptation and application of the demosaicking algorithm have the following steps:

A step S331 for reducing a three-color Bayer pattern BAYER underlying the demosaicking algorithm to a two-color checkerboard pattern BAYER*.

A step S332 for computationally rotating the checkerboard pattern BAYER* by 45° clockwise.

A step S333 for assigning one color of the rotated checkerboard pattern BAYER** to the Hi- and/or Lo-detector data and the other color of the checkerboard to the Lo-detector data.

A step S334 for applying the demosaicking algorithm to the rotated checkerboard pattern BAYER** to the acquired real Hi- and/or Lo-detector data of the two-dimensional Hi/Lo-detector data matrix M6-M10; M6*.

As a result, the required virtual (i.e., missing) detector data are calculated by means of the adapted demosaicking algorithm in a similar way as the other two primary colors missing for a certain pixel can be calculated for a photosensor chip with BAYER color filter.

Figure 17:
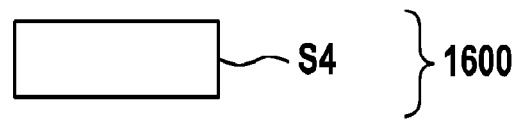

FIG. 17 illustrates a readout method 1600 for reading out Hi-detector and Lo-detector elements of a dual-energy X-ray detector 1, such as is shown in FIG. 1*b* and may be installed, for example, in an X-ray inspection apparatus 200 of FIG. 6. According to FIG. 1*b*, the dual-energy X-ray detector 1 has at least: a dual-energy X-ray detector line 2 with, per pixel, in each case one high-energy Hi-detector element 5 and one low-energy Lo-detector element 4, which are arranged substantially congruently one above the other in the direction of the X-rays RX to be detected. The Hi- and/or Lo-detector data of the detector line 2 to be read out are defined as Hi(n) or Lo(n) for a respective Hi- and/or Lo-detector datum with the location variable n=1, 2, 3, ..., N for the respective position of the associated detector element in the detector line 2, where $1 \leq n \leq N$ and N is the respective number of Hi- and Lo-detector elements in the line direction.

The readout method 1600 of FIG. 17 substantially includes a step S4 for reading out the Hi- and Lo-detector elements, in which initially all detector elements of one type, i.e., Lo or Hi, are read out along the location variable n, and subsequently all other detector elements of the other type are read out along the location variable n.

What is claimed is:

1. A dual-energy X-ray detector comprising a first detector line having first detector elements and a second detector line arranged parallel thereto and having second detector elements, wherein the detector lines are arranged parallel to one another in the line direction and are arranged one behind the other in the direction of the X-rays (RX) to be detected in such a way that the projection of the first and the second detector lines in the direction of one of the X-rays (RX) to be detected, which passes through the surface center of gravity of a reference detector element of the first or the second detector line, are overlappingly offset from one another by an effective offset (Δx; Δz), wherein the effective offset includes a first offset (Δx) in the line direction and a second offset (Δz) in a z-direction orthogonal to the line direction and to the direction of the X-rays (RX) to be detected.

2. The dual energy X-ray detector according to claim 1, wherein the detector lines are configured to be differentially spectrally selectively responsive to a spectrum of X-rays (RX) to be detected by the first detector line having associated first detector elements in the form of Lo-detector elements for primarily detecting low energy X-rays and the second detector line having associated second detector elements in the form of Hi-detector elements for primarily detecting high energy X-rays.

3. The dual energy X-ray detector according to claim 1, wherein:

said first detector line having said first detector elements and said second detector line having said second detector elements are spaced apart from each other by a predetermined distance (D) and inclined with respect to a reference X-ray beam (RXref) in the line direction and/or orthogonal to the line direction by an inclination angle (α).

4. The dual energy X-ray detector according to claim 1, wherein
the first offset (Δx) corresponds to half the width of the first and second detector elements in the line direction; and/or
the second offset (Δz), based on a ratio of a readout frequency f in 1/s for the detector elements and on a transport speed b in cm/s of an inspection object relative to the dual energy X-ray detector, is defined as $$\Delta z = \frac{(m \cdot b)}{(2 \cdot f)},$$

where m is an odd integer (m=1, 3, 5, 7, . . . ).

5. An X-ray inspection apparatus comprising a dual-energy X-ray detector according to claim 1, wherein
the X-ray inspection apparatus is configured for transporting an inspection object in a transport direction (TD) parallel to the z-direction through the inspection apparatus;
the line direction of the dual energy X-ray detector is arranged orthogonal to the transport direction (TD); and
the X-ray inspection apparatus is further configured to provide acquired first detector data ($Lo_1$, $Lo_2$, $Lo_3$, . . . , $Lo_N$) and second detector data ($Hi_1$, $Hi_2$, $Hi_3$, . . . , $Hi_N$) of the inspection object.

6. A method for processing first detector data ($Lo_1$, $Lo_2$, $Lo_3$, . . . , $Lo_N$) and second detector data ($Hi_1$, $Hi_2$, $Hi_3$, . . . , $Hi_N$) provided by the X-ray inspection apparatus according to claim 5, the method comprising:
(S1) calculating a respective virtual first detector datum (vLo) at the position of a real second detector element; and/or
(S2) calculating a respective virtual second detector datum (vHi) at the position of a real first detector element.

7. The method according to claim 6, wherein the (S1) calculating a virtual first detector datum (vLo) at the position of a real second detector element comprises: (S11) calculating the virtual first detector datum based on a certain first number of real first detector data adjacent to the real second detector element and a certain second number of real second detector data adjacent to the real second detector element; and
(S2) calculating a virtual high detector datum (vHi) at the position of a real low detector element comprises: (S21) calculating the virtual second detector datum based on the determined first number of real second detector data adjacent to the real first detector element and the determined second number of real first detector data adjacent to the real first detector element.

8. The method according to claim 6, wherein the method comprises at least one of the following steps:
(S12) calculating the virtual first detector data as an average of adjacent first and second detector data and/or calculating (S22) the virtual second detector data as an average of adjacent second and first detector data;
(S14) calculating the virtual first detector data taking into account the behavior of the values of the second detector data, and/or (S24) calculating the virtual second detector data taking into account the behavior of the values of the first detector data; and (S5) calculating the virtual second or first detector data based on the provided first and second detector data using a deep learning algorithm.

9. The method according to claim 6,
wherein the detector data acquired and provided by the dual energy X-ray detector is indexed by a location variable n extending in the line direction of the dual energy X-ray detector starting at one end such that the first detector elements are real first detector data $Lo_1$, $Lo_2$, . . . , $Lo_n$, . . . , $Lo_N$ of the inspection object and the second detector elements detect corresponding real second detector data $Hi_1$, $Hi_2$, . . . , $Hi_n$, . . . , $Hi_N$ of the inspection object, where $1 \leq n \leq N$ and N is respectively the number of the second and first detector elements in the line direction of the dual energy X-ray detector; and
the method further comprises:
(S31) reading out the real second and first detector elements of the dual energy X-ray detector in pairs in the order $Hi_1$, $Lo_1$, $Hi_2$, $Lo_2$, . . . , $Hi_n$, $Lo_n$, . . . , $Hi_N$, $Lo_N$ or vice versa in the order $Lo_1$, $Hi_1$, $Lo_2$, $Hi_2$, . . . , $Lo_n$, $Hi_n$, . . . , $Lo_N$, $Hi_N$);
(S32) forming, by means of a plurality of sequences read out by said reading-out step, a two-dimensional detector data matrix (M5-M10; M6*); and
(S33) calculating the virtual second and/or first detector data using an adapted demosaicking algorithm comprising:
(S331) reducing a three-color Bayer pattern (BAYER) underlying the demosaicking algorithm to a two-color checkerboard pattern (BAYER*);
(S332) rotating the checkerboard pattern (BAYER*) 45° clockwise;
(S333) assigning one color of the rotated checkerboard pattern (BAYER**) to the second detector data and the other color of the checkerboard to the first detector data; and
(S334) applying the demosaicking algorithm adapted to the rotated checkerboard pattern (BAYER **) to the acquired real second and first detector data of the two-dimensional detector data matrix (M6-M10; M6*).

10. A readout method for first and second detector elements of a dual-energy X-ray detector, in particular in an X-ray inspection apparatus of claim 5, wherein the dual-energy X-ray detector comprises at least one dual-energy X-ray detector line with, per pixel, in each case one high-energy second detector element and one low-energy first detector element, which are arranged substantially congruently one above the other in the direction of the X-rays (RX) to be detected, wherein the second and first detector data of the detector line to be read out are defined as Hi(n) or Lo(n) for a respective second or first detector datum with the location variable n=1, 2, 3, . . . . N for the respective position of the associated detector element in the detector line, where $1 \leq n \leq N$ and N is the respective number of second and first detector elements in the line direction, the readout method comprising:
(S7) reading out the second and first detector elements such that initially all detector elements of one type are read out along the location variable n and subsequently all other detector elements of the other type are read out along the location variable n.

11. A processing apparatus for processing the first detector data ($Lo_1$, $Lo_2$, $Lo_3$, . . . , $Lo_N$) and second detector data ($Hi_1$, $Hi_2$, $Hi_3$, . . . , $Hi_N$) provided by the X-ray inspection apparatus according to claim 5.

12. A system comprising an X-ray inspection apparatus according to claim 5, wherein the X-ray inspection apparatus is configured to provide the second and first detector data based on scanning an inspection object to a processing apparatus and is connected to the processing apparatus for data communication therewith.

13. A computer program product comprising instructions which, when the computer program is executed by a computer, cause the computer to execute the method according to claim 6.

14. A computer-readable data carrier comprising a computer program product according to claim 13.

15. A data carrier signal transmitting the computer program product according to claim 13.

16. The dual-energy X-ray detector of claim 1, wherein an effective detection area of each first detector element is equal to an effective detection area of each second detector element.

* * * * *